(12) United States Patent
Ridder et al.

(10) Patent No.: US 9,982,903 B1
(45) Date of Patent: May 29, 2018

(54) HVAC SYSTEM WITH PREDICTIVE FREE COOLING CONTROL BASED ON THE COST OF TRANSITIONING INTO A FREE COOLING STATE

(71) Applicant: Johnson Controls Technology Company, Plymouth, MI (US)

(72) Inventors: Bradley J. Ridder, Milwaukee, WI (US); Graeme Willmott, West Milwaukee, WI (US); Matthew J. Asmus, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days. days.

(21) Appl. No.: 15/411,878

(22) Filed: Jan. 20, 2017

(51) Int. Cl.
*F24F 11/00* (2018.01)
*G01W 1/10* (2006.01)

(52) U.S. Cl.
CPC ........ *F24F 11/0001* (2013.01); *F24F 11/006* (2013.01); *F24F 11/0012* (2013.01); *F24F 11/0076* (2013.01); *F24F 2011/0002* (2013.01); *F24F 2011/0013* (2013.01); *F24F 2011/0047* (2013.01); *F24F 2011/0075* (2013.01); *G01W 1/10* (2013.01)

(58) Field of Classification Search
None
See application file for complete search history.

(56) References Cited

U.S. PATENT DOCUMENTS

| 6,219,590 | B1 | 4/2001 | Bernaden, III et al. |
|---|---|---|---|
| 7,827,813 | B2 | 11/2010 | Seem |
| 8,027,742 | B2 | 9/2011 | Seem et al. |
| 8,096,140 | B2 | 1/2012 | Seem |
| 8,200,344 | B2 | 6/2012 | Li et al. |
| 8,200,345 | B2 | 6/2012 | Li et al. |
| 8,495,888 | B2 | 7/2013 | Seem |
| 2003/0155429 | A1* | 8/2003 | Sparling ............... F24F 11/0012 236/49.3 |
| 2012/0042672 | A1* | 2/2012 | Fujihara ................... F24F 3/14 62/157 |

(Continued)

OTHER PUBLICATIONS

Braun 'Load Control Using Building Thermal Mass' Transactions of the ASME, vol. 125, pp. 292-301, 2003.*

(Continued)

*Primary Examiner* — Mohammad Ali
*Assistant Examiner* — Bernard G Lindsay
(74) *Attorney, Agent, or Firm* — Foley & Lardner LLP

(57) ABSTRACT

A heating, ventilation, or air conditioning (HVAC) system for a building includes, a chiller, a heat exchanger separate from the chiller, and a controller. The chiller is configured to provide mechanical cooling for a cooling load in the building when the HVAC system operates in a mechanical cooling state. The heat exchanger is configured to provide free cooling for the cooling load in the building when the HVAC system operates in a free cooling state. The controller is configured to predict outside air temperature and transition the HVAC system from operating in the mechanical cooling state to operating in the free cooling state in response to a determination that the predicted outside air temperature will be less than the free cooling temperature threshold for at least the minimum free cooling time.

18 Claims, 10 Drawing Sheets

(56) References Cited

U.S. PATENT DOCUMENTS

| | | | |
|---|---|---|---|
| 2014/0008043 A1* | 1/2014 | Canney | G05D 23/1919 165/104.33 |
| 2014/0148968 A1* | 5/2014 | Chapman | F24F 11/006 700/300 |
| 2014/0350738 A1* | 11/2014 | Angerame | G05B 13/04 700/291 |
| 2016/0132027 A1 | 5/2016 | Li et al. | |
| 2017/0198933 A1* | 7/2017 | Erpelding | F24F 11/006 |

OTHER PUBLICATIONS

U.S. Appl. No. 15/232,800, filed Aug. 9, 2016, Johnson Controls Technology Company.

* cited by examiner

HVAC SYSTEM WITH PREDICTIVE FREE COOLING CONTROL BASED ON THE COST OF TRANSITIONING INTO A FREE COOLING STATE

BACKGROUND

The present disclosure relates generally to heating, ventilation, or air conditioning (HVAC) systems for a building. The present disclosure relates more particularly to a HVAC system configured to operate in a free cooling state and a mechanical cooling state.

Free cooling is a cooling technique which uses low temperature outside air to provide cooling for a system without requiring the use of chillers. Free cooling can be used as an alternative to mechanical cooling (e.g., vapor compression cooling) under certain weather conditions. When free cooling is used, the chillers providing mechanical cooling can be deactivated and cooling towers used to provide free cooling.

In traditional free cooling systems, free cooling is used whenever the outdoor wet bulb air temperature is below a minimum temperature required for free cooling. However, the traditional approach does not take into account the economic cost associated with transitioning between free cooling and mechanical cooling. For example, switching between a mechanical cooling state and a free cooling state may incur an economic cost. It would be desirable to provide a HVAC system which uses economically optimal control to transition between a mechanical cooling state and a free cooling state.

SUMMARY

One implementation of the present disclosure is a heating, ventilation, or air conditioning (HVAC) system for a building. The HVAC system includes, a chiller, a heat exchanger separate from the chiller, and a controller. The chiller is configured to provide mechanical cooling for a cooling load in the building when the HVAC system operates in a mechanical cooling state. The heat exchanger is configured to provide free cooling for the cooling load in the building when the HVAC system operates in a free cooling state. The controller is configured to predict outside air temperature for a plurality of future time steps, determine whether the predicted outside air temperature will be less than a free cooling temperature threshold for at least a minimum free cooling time, and transition the HVAC system from operating in the mechanical cooling state to operating in the free cooling state in response to a determination that the predicted outside air temperature will be less than the free cooling temperature threshold for at least the minimum free cooling time. In some embodiments, the outside air temperature is a wet bulb temperature of the outside air.

In some embodiments, the controller is configured to determine whether the predicted outside air temperature will be greater than the free cooling temperature threshold for at least a minimum mechanical cooling time and transition the HVAC system from operating in the free cooling state to operating in the mechanical cooling state in response to a determination that the predicted outside air temperature will be greater than the free cooling temperature threshold for at least the minimum mechanical cooling time.

In some embodiments, the controller is configured to identify an actual outside air temperature, determine whether the actual outside air temperature is above the free cooling temperature threshold, and transition the HVAC system from operating in the free cooling state to operating in a no cooling state in response to a determination that the actual outside air temperature is above the free cooling temperature threshold.

In some embodiments, the controller is configured to transition the HVAC system from operating in the free cooling state to operating in the no cooling state in response to a determination that the actual outside air temperature is currently above the free cooling temperature threshold and predicted to drop below the free cooling temperature threshold within a predetermined amount of time.

In some embodiments, the controller is configured to identify an actual outside air temperature, determine whether the actual outside air temperature is below the free cooling temperature threshold, and transition the HVAC system from operating in a no cooling state to operating in the free cooling state in response to a determination that the actual outside air temperature is below the free cooling temperature threshold.

In some embodiments, the controller is configured to transition the HVAC system from operating in the no cooling state to operating in the mechanical cooling state in response to a determination that the actual outside air temperature is currently above the free cooling temperature threshold and predicted to remain above the free cooling temperature threshold for at least a predetermined amount of time.

In some embodiments, the controller is configured to calculate the minimum free cooling time based on an estimated cost savings resulting from operating the HVAC system in the free cooling state relative to operating the HVAC system in the mechanical cooling state.

In some embodiments, the controller is configured to calculate the minimum free cooling time by identifying a cost incurred as a result of transitioning the HVAC system into the free cooling state, estimating a cost savings resulting from operating the HVAC system in the free cooling state relative to operating the HVAC system in the mechanical cooling state as a function of an amount of time the HVAC system operates in the free cooling state, and determining a minimum amount of time the HVAC system is required to operate in the free cooling state for the cost savings to be greater than or equal to the cost incurred.

In some embodiments, the controller is configured to estimate the cost savings by determining an amount of energy savings resulting from operating the HVAC system in the free cooling state relative to operating the HVAC system in the mechanical cooling state, identifying a cost per unit energy for each of the future time steps during which the HVAC system will operate in the free cooling state, and calculating the cost savings by multiplying the amount of energy savings by the cost per unit energy.

In some embodiments, the cost incurred includes at least one of an economic cost of equipment degradation and an increase in electricity cost resulting from stopping and restarting starting the chiller.

Another implementation of the present disclosure is a method for operating a heating, ventilation, or air conditioning (HVAC) system for a building. The method includes operating the HVAC system in a mechanical cooling state in which a chiller is used to provide mechanical cooling for a cooling load in the building, predicting outside air temperature for a plurality of future time steps, determining whether the predicted outside air temperature will be less than a free cooling temperature threshold for at least a minimum free cooling time, transitioning the HVAC system from operating in the mechanical cooling state to operating in a free cooling state in response to a determination that the predicted outside air temperature will be less than the free cooling temperature threshold for at least the minimum free cooling time, and operating the HVAC system in the free cooling state in which a heat exchanger separate from the chiller is used to provide free cooling for the cooling load in the building. In some embodiments, the outside air temperature is a wet bulb temperature of the outside air.

In some embodiments, the method includes determining whether the predicted outside air temperature will be greater than the free cooling temperature threshold for at least a minimum mechanical cooling time and transitioning the HVAC system from operating in the free cooling state to operating in the mechanical cooling state in response to a determination that the predicted outside air temperature will be greater than the free cooling temperature threshold for at least the minimum mechanical cooling time.

In some embodiments, the method includes identifying an actual outside air temperature, determining whether the actual outside air temperature is above the free cooling temperature threshold, and transitioning the HVAC system from operating in the free cooling state to operating in a no cooling state in response to a determination that the actual outside air temperature is above the free cooling temperature threshold.

In some embodiments, transitioning the HVAC system from operating in the free cooling state to operating in the no cooling state occurs in response to a determination that the actual outside air temperature is currently above the free cooling temperature threshold and predicted to drop below the free cooling temperature threshold within a predetermined amount of time.

In some embodiments, the method includes identifying an actual outside air temperature, determining whether the actual outside air temperature is below the free cooling temperature threshold, and transitioning the HVAC system from operating in a no cooling state to operating in the free cooling state in response to a determination that the actual outside air temperature is below the free cooling temperature threshold.

In some embodiments, transitioning the HVAC system from operating in the no cooling state to operating in the mechanical cooling state occurs in response to a determination that the actual outside air temperature is currently above the free cooling temperature threshold and predicted to remain above the free cooling temperature threshold for at least a predetermined amount of time.

In some embodiments, the method includes calculating the minimum free cooling time based on an estimated cost savings resulting from operating the HVAC system in the free cooling state relative to operating the HVAC system in the mechanical cooling state.

In some embodiments, the method includes calculating the minimum free cooling time by identifying a cost incurred as a result of transitioning the HVAC system into the free cooling state, estimating a cost savings resulting from operating the HVAC system in the free cooling state relative to operating the HVAC system in the mechanical cooling state as a function of an amount of time the HVAC system operates in the free cooling state, and determining a minimum amount of time the HVAC system is required to operate in the free cooling state for the cost savings to be greater than or equal to the cost incurred.

In some embodiments, estimating the cost savings includes determining an amount of energy savings resulting from operating the HVAC system in the free cooling state relative to operating the HVAC system in the mechanical cooling state, identifying a cost per unit energy for each of the future time steps during which the HVAC system will operate in the free cooling state, and calculating the cost savings by multiplying the amount of energy savings by the cost per unit energy.

In some embodiments, the cost incurred includes at least one of an economic cost of equipment degradation and an increase in electricity cost resulting from stopping and restarting starting the chiller.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements, in which.

DETAILED DESCRIPTION

Overview

Figure 1:
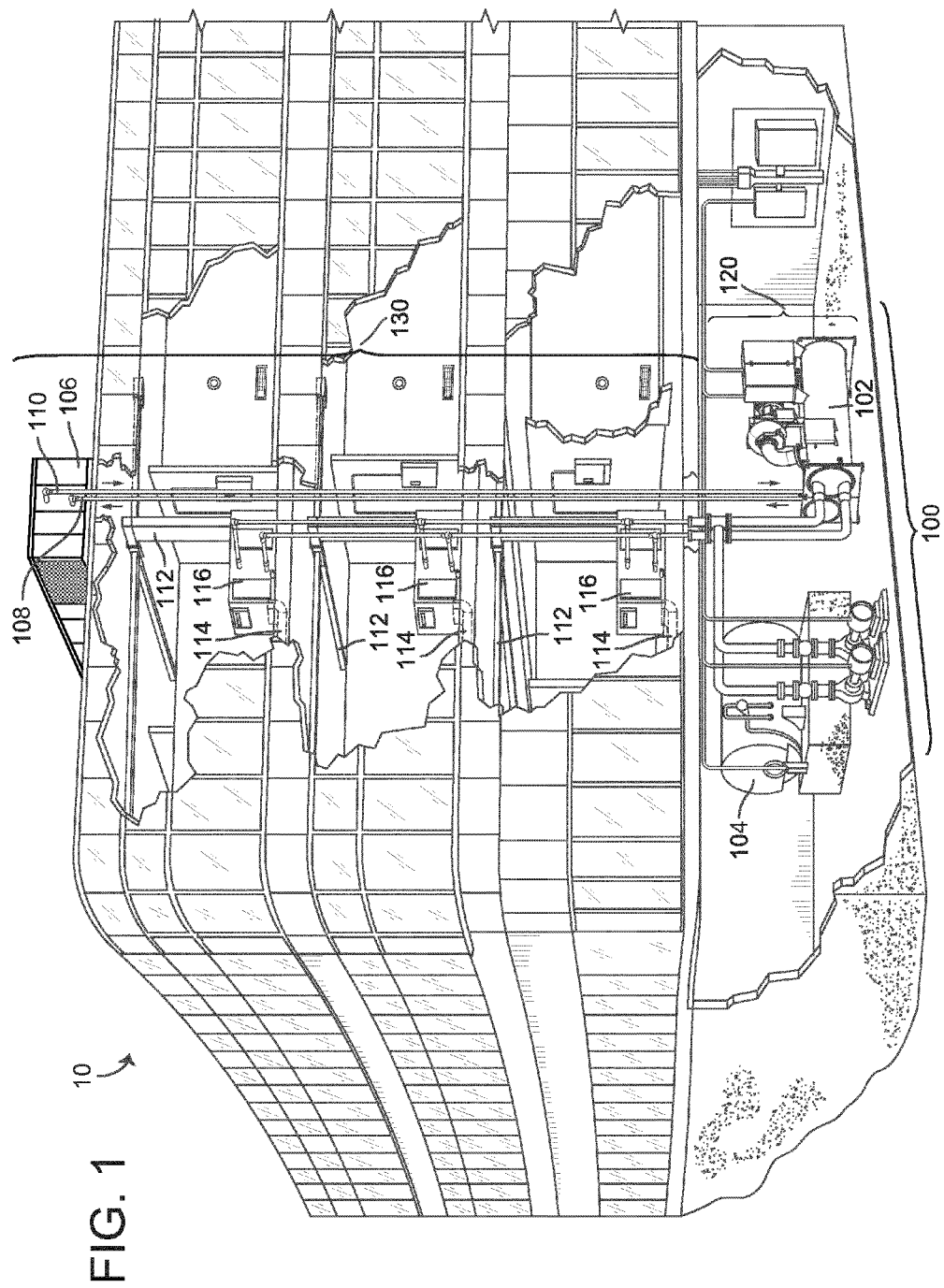
FIG. 1 is a drawing of a building equipped with a heating, ventilation, or air conditioning (HVAC) system, according to an exemplary embodiment.

Referring generally to the FIGURES, a heating, ventilation, or air conditioning (HVAC) system with predictive free cooling control and components thereof are shown, according to various exemplary embodiments. The HVAC system can operate in both a mechanical cooling state and a free cooling state. The HVAC system can transition between the mechanical cooling state and free cooling state to provide economically optimal cooling for a cooling load. In some embodiments, the HVAC system includes a controller which can evaluate state transition conditions and transition between operating states based on a result of the evaluation.

In traditional free cooling systems, free cooling is typically used whenever the outdoor wet bulb air temperature is below a minimum temperature required for free cooling. However, the traditional approach does not take into account the economic cost associated with transitioning between operating states. For example, switching between a mechanical cooling state and a free cooling state may incur an economic cost. The economic cost may result from increased electricity consumption when a chiller is starting-up, increased equipment degradation resulting from switching chillers on/off, inefficient chiller operation during start-up, electricity required to operate valves, and/or any other economic costs which are incurred as a result of the state transition.

To make free cooling economically viable, the energy and cost savings achieved by free cooling should be sufficient to overcome the cost incurred as a result of transitioning between the mechanical cooling state and the free cooling state. Advantageously, HVAC system described herein can determine whether the use of free cooling would be economically viable by weighing the cost savings achieved by free cooling against the economic cost of performing the state transition. For example, free cooling may be economically viable only if the free cooling lasts for a minimum amount of time. The controller can predict how long the use of free cooling would last as well as the energy savings which would be achieved by the use of free cooling during the predicted free cooling period. The controller can weigh the predicted energy savings against the cost of performing the state transition to determine whether to transition into the free cooling state.

In some embodiments, the controller is configured to predict the outside air temperature $\hat{T}_{OA}$ (e.g., predicted outside air wet bulb temperature) for each of a plurality of time steps into the future. The controller can predict the outside air temperature $\hat{T}_{OA}$ using measurements from sensors and/or weather forecasts from a weather service. When operating in the mechanical cooling state, the controller can determine whether the predicted outside air temperature $\hat{T}_{OA}$ will be below a free cooling temperature threshold $T_{FC}$ for a predetermined amount of time in the future. The controller can transition from the mechanical cooling state to the free cooling state in response to a determination that the predicted outside air temperature $\hat{T}_{OA}$ will remain below the free cooling temperature threshold $T_{FC}$ for the predetermined amount of time.

In some embodiments, the free cooling temperature threshold $T_{FC}$ is a maximum outdoor air wet bulb temperature at which free cooling is possible or economically viable. The predetermined amount of time may be a minimum amount of time $t_{min,FC}$ which free cooling must last in order to justify the economic cost of transitioning into the free cooling state. If the predicted outside air temperature $T_{OA}$ will not stay below the temperature threshold $T_{FC}$ for the predetermined amount of time $t_{min,FC}$, the controller can remain in the mechanical cooling state, even if the current outside air temperature $T_{OA}$ is below the temperature threshold $T_{FC}$. This prevents the HVAC system from transitioning into the free cooling state if the amount of time spent in the free cooling state and the corresponding energy savings are insufficient to overcome the cost incurred as a result of the state transition. Additional features and advantages of the HVAC system are described in detail below.

Building HVAC Systems and Building Management Systems

Figure 2:
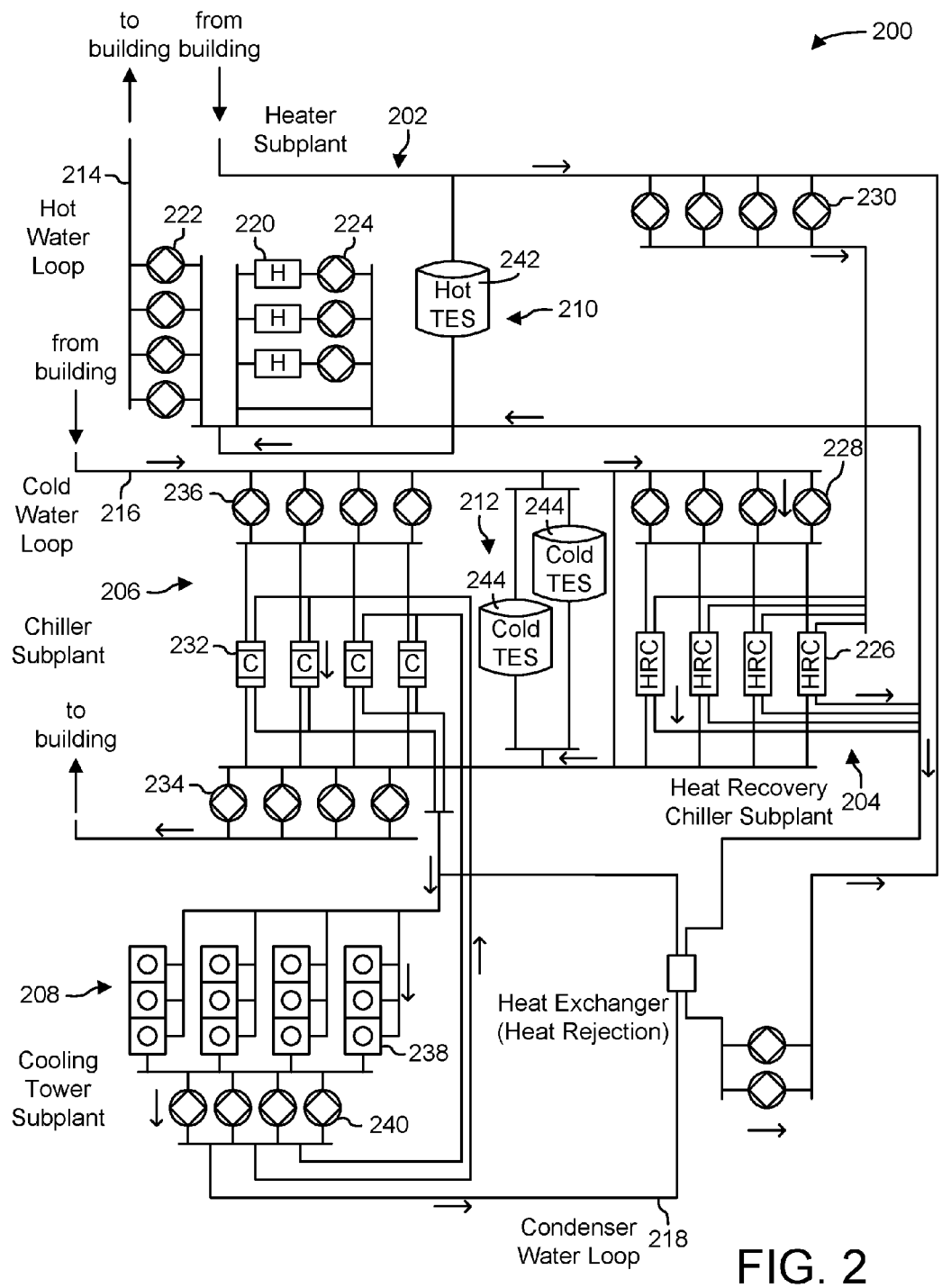
FIG. 2 is a drawing of a waterside system which can be used in combination with the HVAC system of FIG. 1, according to an exemplary embodiment.
Figure 3:
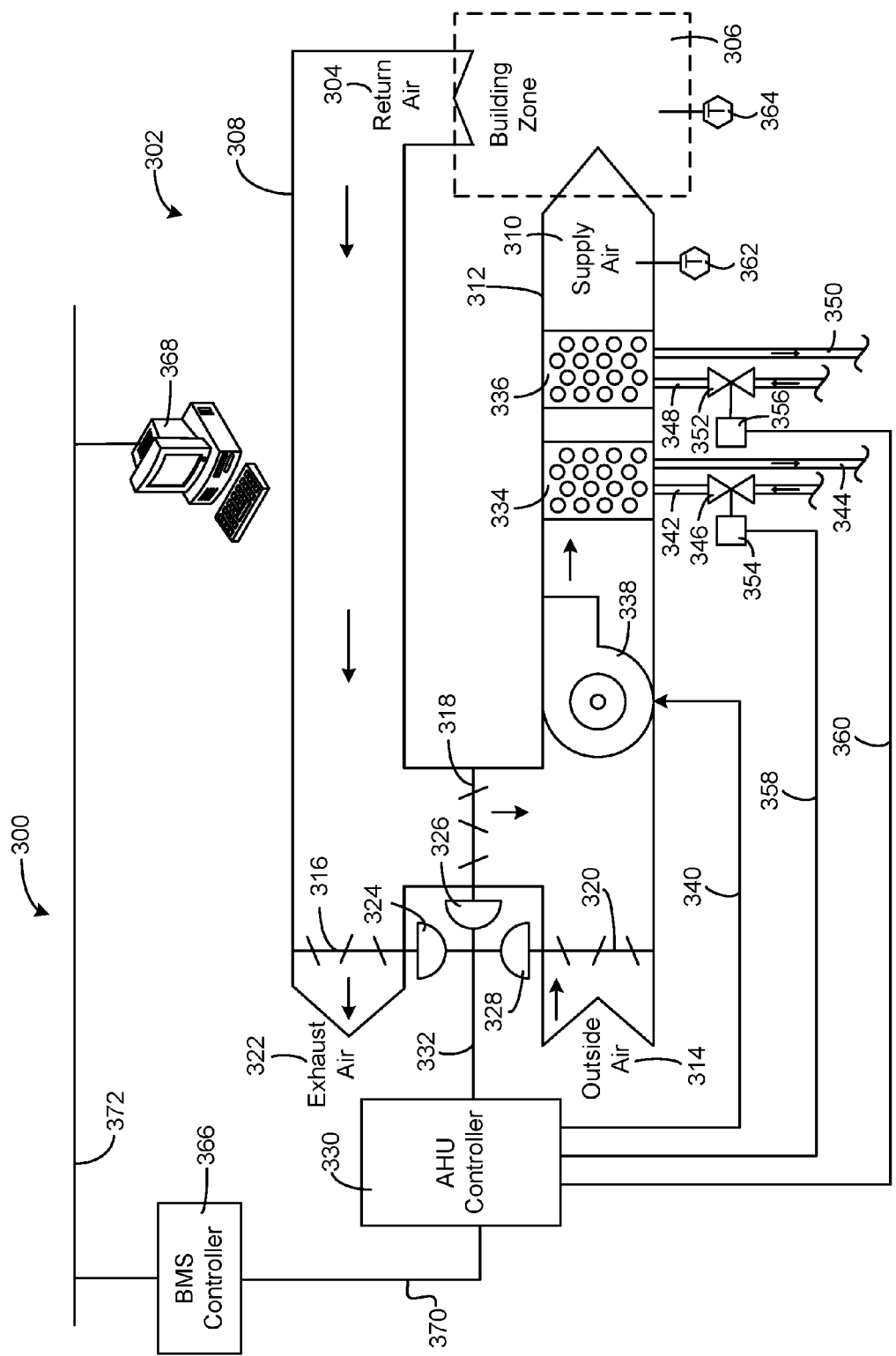
FIG. 3 is a drawing of an airside system which can be used in combination with the HVAC system of FIG. 1, according to an exemplary embodiment.
Figure 4:
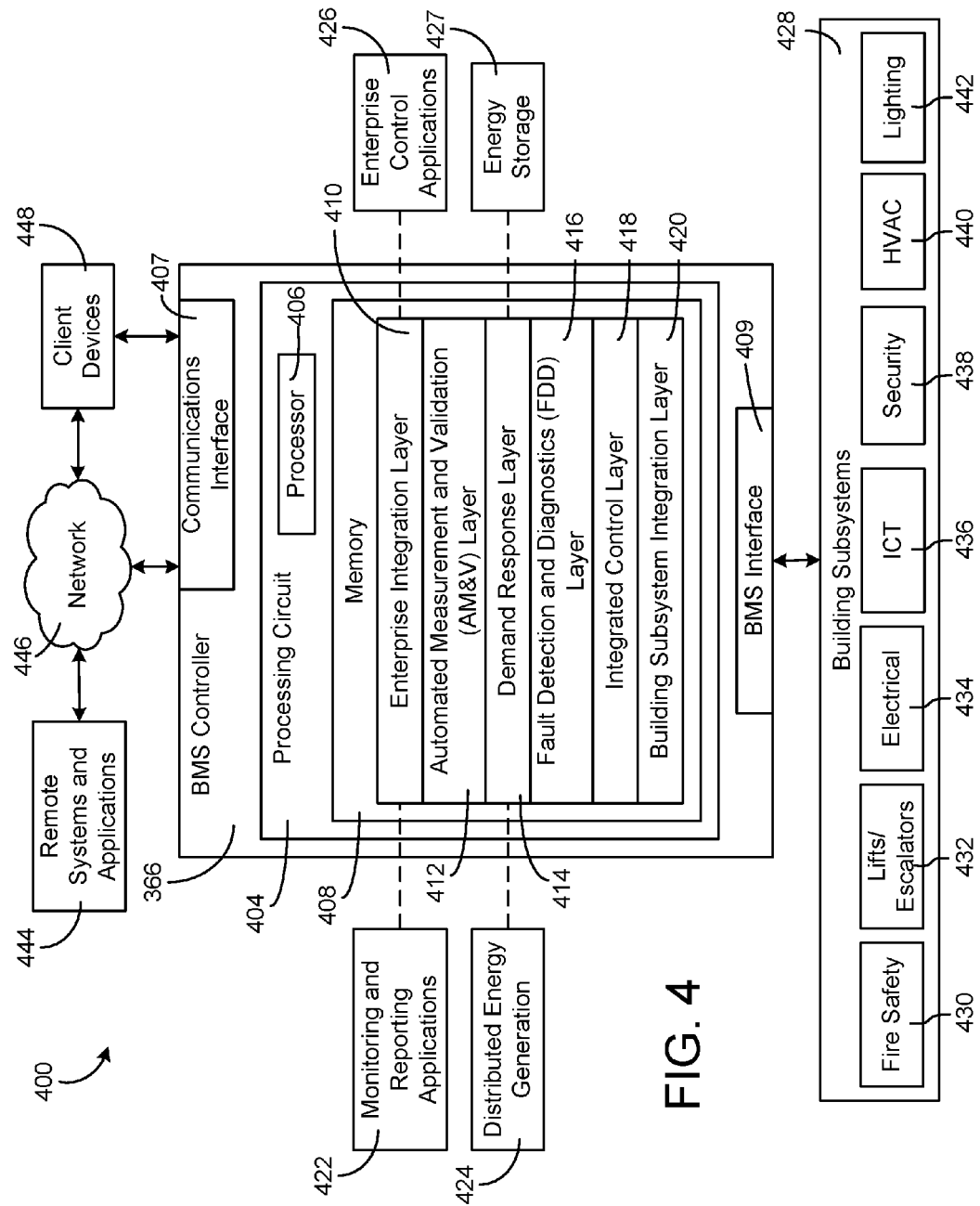
FIG. 4 is a block diagram of a building management system which can be used to monitor and control the building and HVAC system of FIG. 1, according to an exemplary embodiment.
Figure 5:
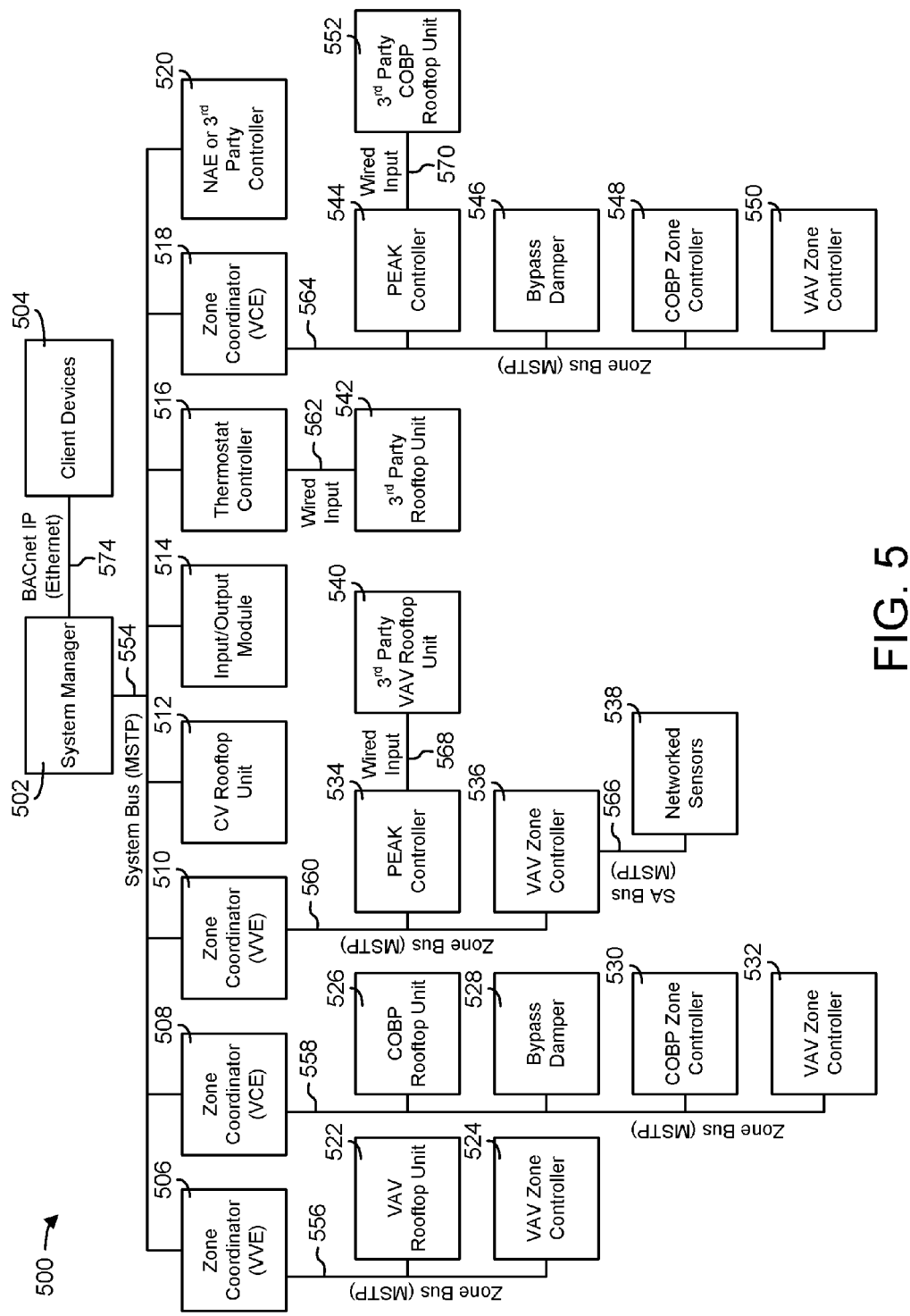
FIG. 5 is a block diagram of another building management system which can be used to monitor and control the building and HVAC system of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air. An example of a free cooling system which can be used in HVAC system 100 is described in greater detail with reference to FIG. 6.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 208 based on the current temperature of the outside air and/or the predicted future temperature of the outside air. An example of a free cooling system which can be used in waterside system 200 is described in greater detail with reference to FIG. 6.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time. An example of free cooling switching logic which can be used by AHU controller 330 is described in greater detail with reference to FIG. 10.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

HVAC System with Free Cooling

Figure 6:
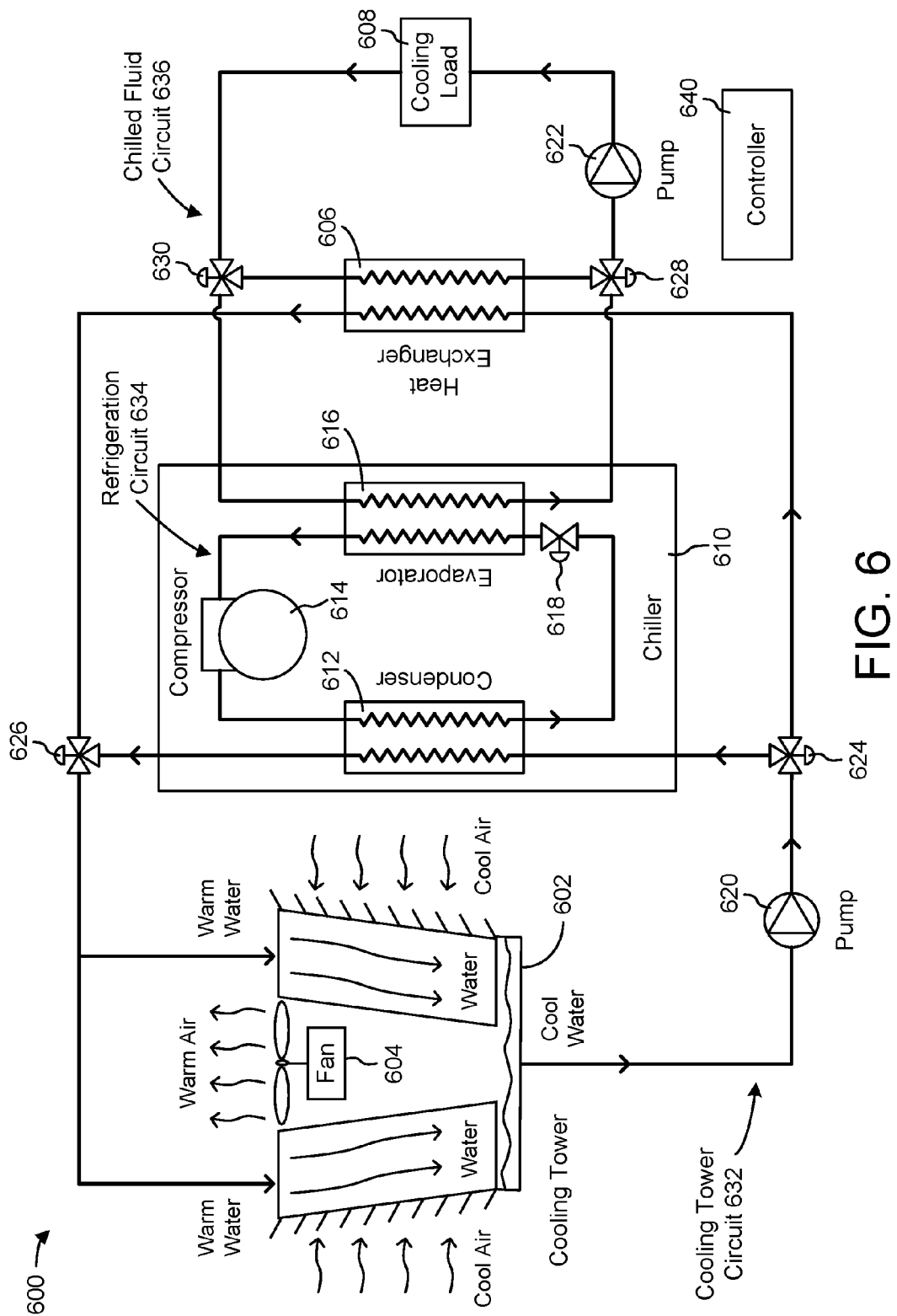
FIG. 6 is a block diagram of a HVAC system configured to operate in a mechanical cooling state and a free cooling state, according to an exemplary embodiment.

Referring now to FIG. 6, a block diagram of a HVAC system 600 with free cooling is shown, according to an exemplary embodiment. HVAC system 600 is configured to provide cooling to a cooling load 608. Cooling load 608 can include, for example, a building zone, a supply airstream flowing through an air duct, an airflow in an air handling unit or rooftop unit, fluid flowing through a heat exchanger, a refrigerator or freezer, a condenser or evaporator, a cooling coil, or any other type of system, device, or space which requires cooling. In some embodiments, a pump 622 circulates a chilled fluid to cooling load 608 via a chilled fluid circuit 636. The chilled fluid can absorb heat from cooling load 608, thereby providing cooling to cooling load 608 and warming the chilled fluid.

HVAC system 600 is shown to include a cooling tower 602, a heat exchanger 606, and a chiller 610. HVAC system 600 can operate in both a mechanical cooling state (shown in FIG. 7) and a free cooling state (shown in FIG. 8). HVAC system 600 can transition between the mechanical cooling state and free cooling state to provide economically optimal cooling for cooling load 608. In the mechanical cooling state, the chilled fluid exiting cooling load 608 is directed to an evaporator 616 of chiller 610. Chiller 610 operates to provide mechanical cooling (e.g., vapor compression cooling) for the chilled fluid in evaporator 616 by transferring heat from the chilled fluid to a refrigerant which circulates through evaporator 616 via a refrigeration circuit 634. In the free cooling state, the chilled fluid exiting cooling load 608 is directed to a heat exchanger 606. Heat exchanger 606 is configured to transfer heat from the chilled fluid to water (or any other coolant) which circulates through heat exchanger 606 via a cooling tower circuit 632.

Cooling tower 602 can be configured to cool the water in cooling tower circuit 632 by transferring heat from the water to outside air. In some embodiments, a pump 620 circulates water through cooling tower 602 via cooling tower circuit 632. Cooling tower 602 may include a fan 604 which causes cool air to flow through cooling tower 602. Cooling tower 602 places the cool air in a heat exchange relationship with the warmer water, thereby transferring heat from warmer water to the cooler air. In the mechanical cooling state, cooling tower 602 can provide cooling for a condenser 612 of chiller 610. Condenser 612 can transfer heat from the refrigerant in refrigeration circuit 634 to the water in cooling tower circuit 632. In the free cooling state, cooling tower 602 can provide cooling for heat exchanger 606. Heat exchanger 606 can transfer heat from the chilled fluid in chilled fluid circuit 636 to the water in cooling tower circuit 632. Although cooling tower circuit 632 is shown and described as circulating water, it should be understood that any type of coolant or working fluid (e.g., water, glycol, $CO_2$, etc.) can be used in cooling tower circuit 632.

Chiller 610 is shown to include a condenser 612, a compressor 614, an evaporator 616, and an expansion device 618. Compressor 614 can be configured to circulate a refrigerant between condenser 612 and evaporator 616 via refrigeration circuit 634. Compressor 614 operates to compress the refrigerant to a high pressure, high temperature state. The compressed refrigerant flows through condenser 612, which transfers heat from the refrigerant in refrigeration circuit 634 to the water in cooling tower circuit 632. The cooled refrigerant then flows through expansion device 618, which expands the refrigerant to a low temperature, low pressure state. The expanded refrigerant flows through evaporator 616, which transfers heat from the chilled fluid in chilled fluid circuit 636 to the refrigerant in refrigeration circuit 634.

In some embodiments, chiller 610 is active only when HVAC system operates in the mechanical cooling state. In the free cooling state, chiller 610 can be deactivated to reduce energy consumption. In some embodiments, HVAC system 600 includes multiple chillers 610. Each of chillers 610 can be arranged in parallel and configured to provide cooling for the fluid in chilled fluid circuit 636. Similarly, HVAC system 600 can include multiple cooling towers 602. Each of the cooling towers 602 can be arranged in parallel and configured to provide cooling for the water in cooling tower circuit 632.

Still referring to FIG. 6, HVAC system 600 is shown to include several valves 624, 626, 628, and 630. Valves 624-630 may be three-way valves which can be operated by a controller 640 to control the flow of the chilled fluid in chilled fluid circuit 636 and the water in cooling tower circuit 632. For example, when HVAC system 600 transitions into the mechanical cooling state, controller 640 can operate valves 628 and 630 to direct the chilled fluid exiting cooling load 608 through evaporator 616 and prevent the chilled fluid from flowing through heat exchanger 606. In the mechanical cooling state, controller 640 can operate valves 624 and 626 to direct the water exiting cooling tower 602 through condenser 612 and prevent the water from flowing through heat exchanger 606. Conversely, when HVAC system 600 transitions into the free cooling state, controller 640 can operate valves 628 and 630 to direct the chilled fluid exiting cooling load 608 through heat exchanger 606 and prevent the chilled fluid from flowing through evaporator 616. In the free cooling state, controller 640 can operate valves 624 and 626 to direct the water exiting cooling tower 602 through heat exchanger 606 and prevent the water from flowing through condenser 612.

Figure 7:
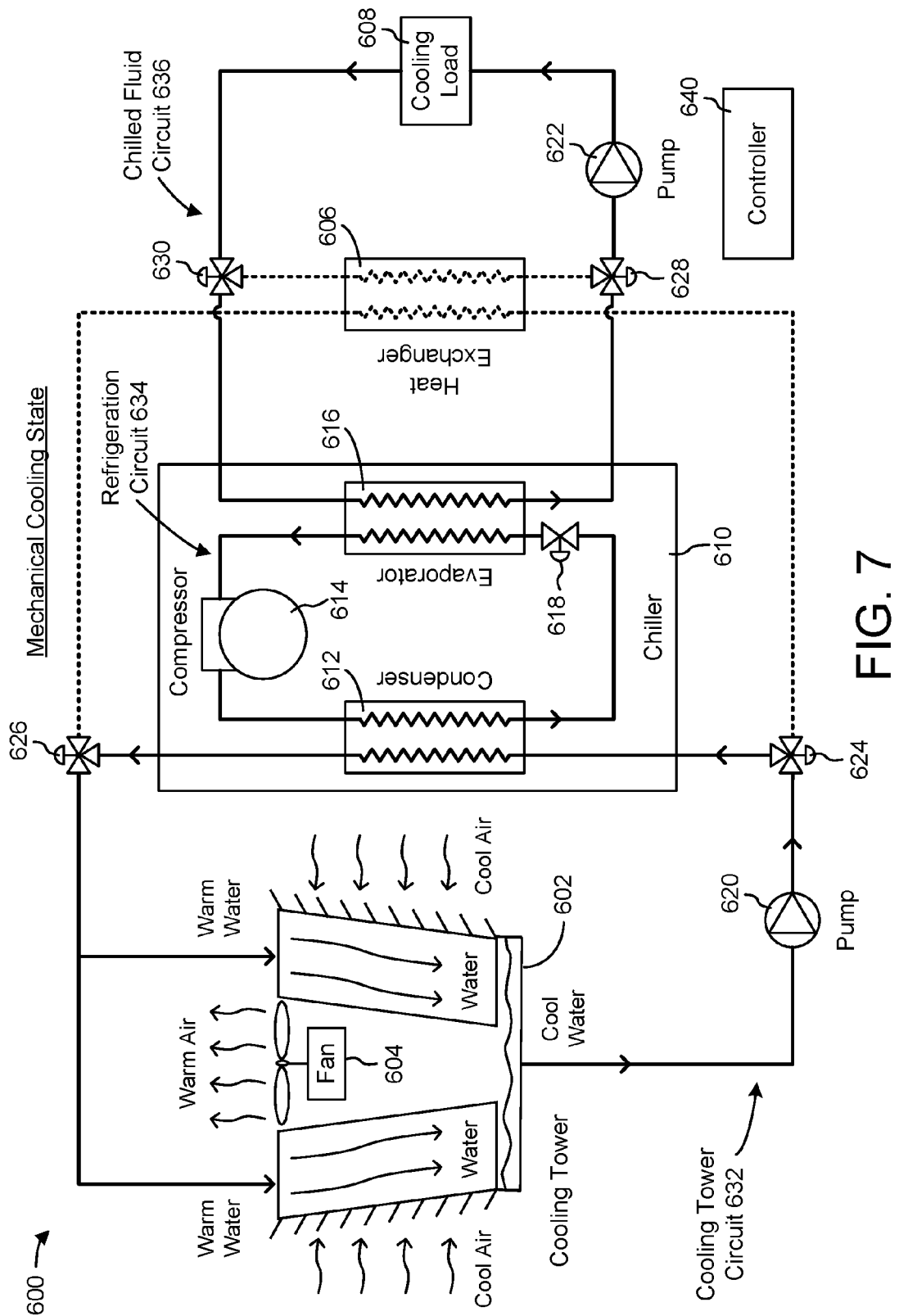
FIG. 7 is a block diagram illustrating operation of the HVAC system of FIG. 6 in the mechanical cooling state, according to an exemplary embodiment.

Referring now to FIG. 7, a block diagram illustrating the operation of HVAC system 600 in the mechanical cooling state is shown, according to an exemplary embodiment. In FIG. 7, the flow paths used in the mechanical cooling state are shown in solid lines, whereas the flow paths not used in the mechanical cooling state are shown in broken lines. In the mechanical cooling state, chiller 610 is used to provide cooling for the chilled fluid in chilled fluid circuit 636. Both chilled fluid circuit 636 and cooling tower circuit 632 are fluidly connected to chiller 610. Heat exchanger 606 is not used and the fluid conduits connecting to heat exchanger 606 are blocked.

In the mechanical cooling state, controller 640 operates valve 624 to direct the cool water from cooling tower 602 through condenser 612. Condenser 612 transfers heat from the refrigerant in refrigeration circuit 634 to the cool water in cooling tower circuit 632, thereby warming the water. The warm water then flows from condenser 612 to valve 626. Controller 640 operates valve 626 to direct the warm water to cooling tower 602. Cooling tower 602 transfers heat from the water to cooler air flowing through cooling tower 602. Controller 640 can operate fan 604 to modulate the airflow through cooling tower 602, which adjusts the rate of heat transfer in cooling tower 602. Controller 640 can also operate pump 620 to modulate the flow rate of the water through cooling tower circuit 632, which adjusts the rate of heat transfer in cooling tower 602 and/or condenser 612.

In the mechanical cooling state, controller 640 operates valve 630 to direct the fluid exiting cooling load 608 through evaporator 616. Evaporator 616 transfers heat from the fluid in chilled fluid circuit 636 to the refrigerant in refrigeration circuit 634, thereby chilling the fluid in chilled fluid circuit 636. The chilled fluid then flows from evaporator 616 to valve 628. Controller 640 operates valve 628 to direct the chilled fluid to cooling load 608. Cooling load 608 rejects heat to the chilled fluid, thereby providing cooling for cooling load 608 and warming the chilled fluid. Controller 640 can operate pump 622 to modulate the flowrate of the chilled fluid through chilled fluid circuit 636, which adjusts the rate of heat transfer in evaporator 616 and/or at cooling load 608.

Figure 8:
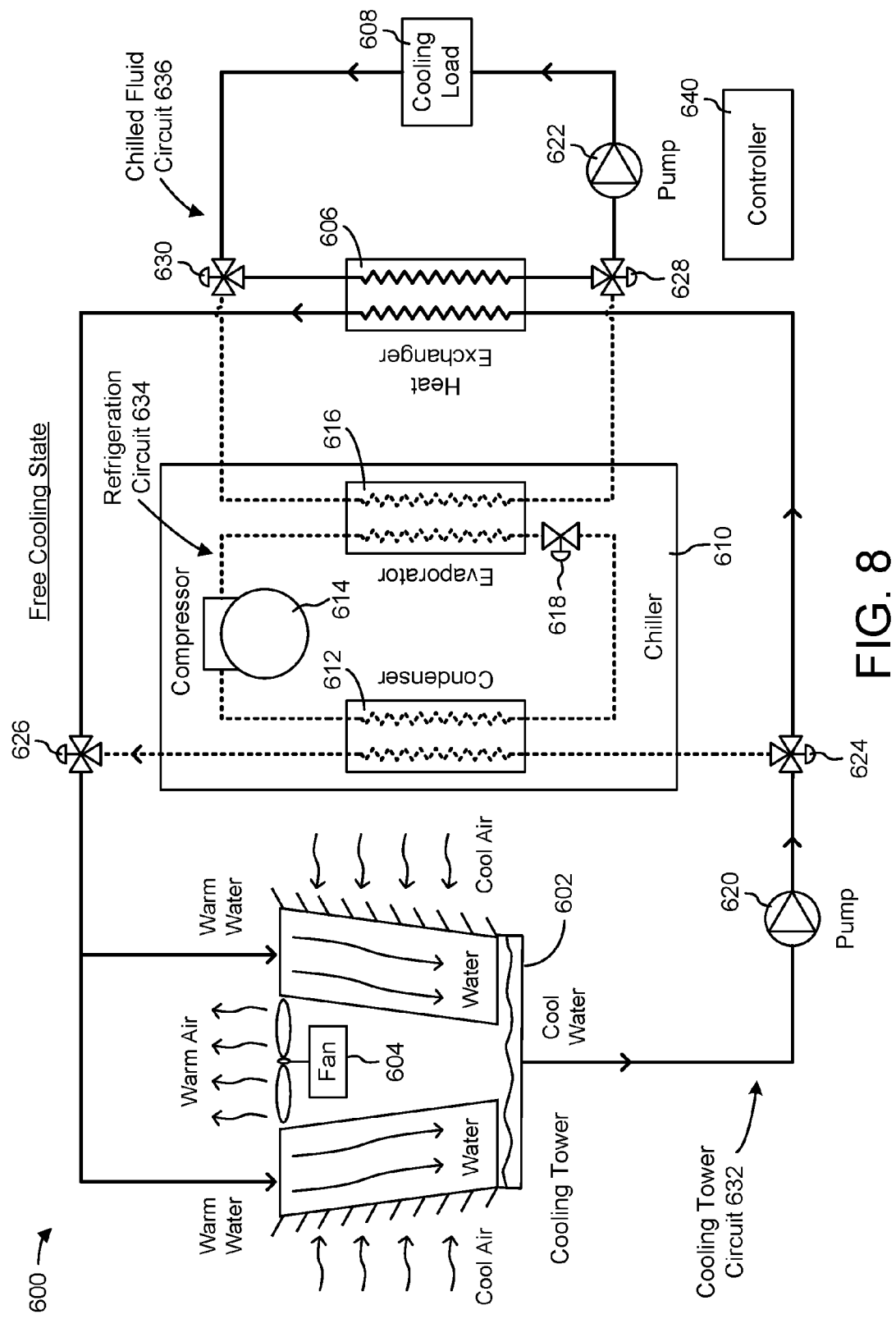
FIG. 8 is a block diagram illustrating operation of the HVAC system of FIG. 6 in the free cooling state, according to an exemplary embodiment.

Referring now to FIG. 8, a block diagram illustrating the operation of HVAC system 600 in the free cooling state is shown, according to an exemplary embodiment. In FIG. 8, the flow paths used in the free cooling state are shown in solid lines, whereas the flow paths not used in the free cooling state are shown in broken lines. In the free cooling state, heat exchanger 606 is used to provide cooling for the chilled fluid in chilled fluid circuit 636. Both chilled fluid circuit 636 and cooling tower circuit 632 are fluidly connected to heat exchanger 606. Chiller 610 is not used and the fluid conduits connecting to chiller 610 are blocked.

In the free cooling state, controller 640 operates valve 624 to direct the cool water from cooling tower 602 through heat exchanger 606. Heat exchanger 606 transfers heat from the fluid in chilled fluid circuit to the cool water in cooling tower circuit 632, thereby warming the water. The warm water then flows from heat exchanger 606 to valve 626. Controller 640 operates valve 626 to direct the warm water to cooling tower 602. Cooling tower 602 transfers heat from the water to cooler air flowing through cooling tower 602. Controller 640 can operate fan 604 to increase or decrease the airflow through cooling tower 602, which increases or decreases the rate of heat transfer in cooling tower 602. Controller 640 can also operate pump 620 to modulate the flow rate of the water through cooling tower circuit 632, which adjusts the rate of heat transfer in cooling tower 602 and/or heat exchanger 606.

In the free cooling state, controller 640 operates valve 630 to direct the fluid exiting cooling load 608 through heat exchanger 606. Heat exchanger 606 transfers heat from the fluid in chilled fluid circuit 636 to the water in cooling tower circuit 632, thereby chilling the fluid in chilled fluid circuit 636. The chilled fluid then flows from heat exchanger 606 to valve 628. Controller 640 operates valve 628 to direct the chilled fluid to cooling load 608. Cooling load 608 rejects heat to the chilled fluid, thereby providing cooling for cooling load 608 and warming the chilled fluid. Controller 640 can operate pump 622 to modulate the flowrate of the chilled fluid through chilled fluid circuit 636, which adjusts the rate of heat transfer in heat exchanger 606 and/or at cooling load 608.

HVAC Controller

Figure 9:
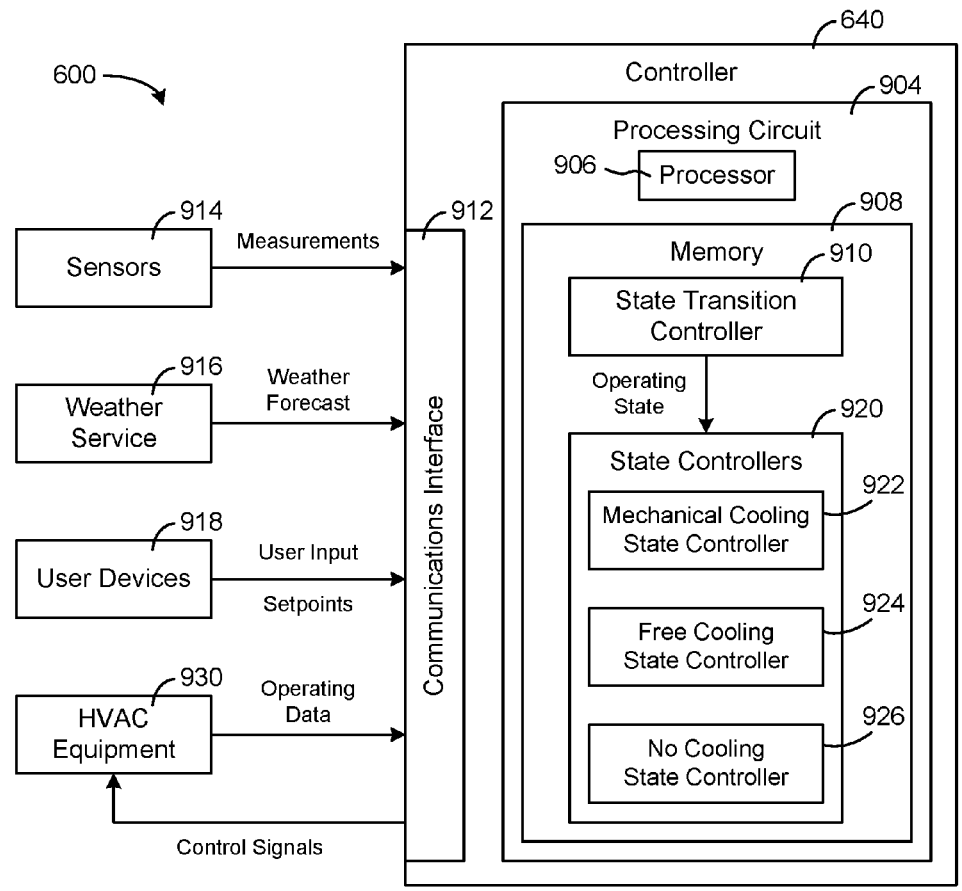
FIG. 9 is a block diagram illustrating a portion of the HVAC system of FIG. 6 in greater detail, according to an exemplary embodiment.

Referring now to FIG. 9, a block diagram illustrating a portion of HVAC system 600 and controller 640 in greater detail is shown, according to an exemplary embodiment. In brief overview, controller 640 receives measurements from sensors 914 and weather forecasts from a weather service 916. Controller 640 uses the sensor measurements and weather forecasts to determine an operating state for HVAC system 600. For example, controller 640 can determine whether to transition into a mechanical cooling state, a free cooling state, or a no cooling state. Controller 640 can generate and provide control signals for HVAC equipment 930 (e.g., valves 624-630, chiller 610, etc.). HVAC equipment 930 operate to affect an environmental condition in a building (e.g., temperature, humidity, airflow, etc.), which can be measured by sensors 914 and provided as a feedback to controller 640.

Controller 640 can be any type of controller in a HVAC system or BMS. In some embodiments, controller 640 is a zone controller configured to monitor and control a building zone. For example, controller 640 can be a zone temperature controller, a zone humidity controller, a zone lighting controller, a VAV zone controller (e.g., VAV zone controllers 524, 532, 536, 550), a COBP zone controller (e.g., COPB controller 530, 548), or any other type of controller for a building zone. In other embodiments, controller 640 is a system controller or subsystem controller. For example, controller 640 can be a BMS controller (e.g., BMS controller 366), a central plant controller, a subplant controller, a supervisory controller for a HVAC system or any other type of building subsystem (e.g., a controller for any of building subsystems 428). In some embodiments, controller 640 is a field controller or device controller configured to monitor and control the performance of a set of HVAC devices or other building equipment. For example, controller 640 can be an AHU controller (e.g., AHU controller 330), a thermostat controller (e.g., thermostat controller 516), a rooftop unit controller, a chiller controller, a damper controller, or any other type of controller in a HVAC system or BMS.

In some embodiments, controller 640 is a hybrid controller which combines the functionality of a discrete control system and a closed loop control system. A discrete control system can be described using a finite state diagram (FSD) and implemented in a finite state machine (FSM). In a discrete control system, a controller evaluates state transition conditions (e.g., using feedback from the controlled system) and transitions between various operating states when one or more of the state transition conditions are satisfied. Each of the operating states in a discrete control system can have a corresponding set of control outputs. In some embodiments, the control outputs in a discrete control system remain constant as long as the controller remains in the same operating state and change only when the controller transitions into a new operating state.

A closed loop control system can be implemented using any of a variety of control techniques (e.g., feedback control, feedforward control, extremum seeking control, proportional-integral control, proportional-integral-derivative control, model predictive control, etc.). In a closed loop control system, a controller modulates a control output (i.e., a manipulated variable) provided to the controlled system over a range of values in order to achieve a desired effect. For example, the controller can modulate the control output to drive a monitored variable to a setpoint. In some embodiments, the controller uses feedback from the controlled system to determine an error between the setpoint and the monitored variable. The controller can variably increase or decrease the control output within the range of values in order to drive the error to zero.

Controller 640 can include both discrete control elements and closed loop control elements. For example, controller 640 is shown to include a state transition controller 910 and a plurality of state controllers 920 (i.e., mechanical cooling state controller 922, free cooling state controller 924, and no cooling state controller 926). State transition controller 910 can operate as a finite state machine to evaluate state transition conditions and transition between various operating states. The state transition conditions and the logic used by state transition controller 910 can be stored in a database for later retrieval. In some embodiments, state transition controller 910 provides an indication of the current operating state to state controllers 920. State transition controller 910 is described in greater detail below.

Each of state controllers 920 can operate as a closed loop controller within a particular operating state. In some embodiments, each state controller 920 becomes active when state transition controller 910 transitions into the corresponding operating state and inactive when state transition controller 910 transitions out of the corresponding operating state. In some embodiments, each of state controllers 920 uses a different control algorithm and/or different control logic. This allows controller 640 to function as multiple different controllers, each of which controls the operation of system 600 in a particular operating state. State controllers 920 are described in greater detail below.

Still referring to FIG. 9, HVAC system 600 is shown to include sensors 914, weather service 916, user devices 918, and HVAC equipment 930. Sensors 914 can include any of a variety of sensors configured to measure a variable state or condition in a building. For example, sensors 914 can include temperature sensors, humidity sensors, airflow sensors, lighting sensors, pressure sensors, voltage sensors, or any other type of sensor. Sensors 914 can be distributed throughout a building and configured to measure various environmental conditions at different locations in the building. For example, one of sensors 914 can be located in a first zone of the building and configured to measure the temperature of the first zone, whereas another of sensors 914 can be located in a second zone of the building and configured to measure the temperature of the second zone. Similarly, sensors 914 can be distributed throughout a HVAC system and configured to measure conditions at different locations in the HVAC system. For example, one of sensors 914 can be a supply air temperature sensor configured to measure the temperature of the airflow provided to a building zone from an AHU, whereas another of sensors 914 can be a return air temperature sensor configured to measure the temperature of the airflow returning from the building zone to the AHU.

In some embodiments, sensors 914 include outdoor air sensors configured to measure the temperature, pressure, humidity, or other attributes of the air outside the building. Sensors 914 can provide measurements as inputs to controller 640 via communications interface 902. In some embodiments, sensors 914 provide a feedback signal to controller 640 indicating the value of a variable of interest in the controlled system (e.g., building zone temperature, building zone humidity, system power consumption, etc.) or outside the controlled system (e.g., outdoor wet bulb air temperature). Controller 640 can use the measurements from sensors 914 to evaluate state transition conditions and/or to perform closed loop control operations within various operating states.

Weather service 916 can be configured to provide weather forecasts to controller 640. The weather forecasts can include temperature forecasts, humidity forecasts, wind forecasts, rain or snow forecasts, or any other type of weather forecast. Controller 640 can use the weather forecasts to predict the temperature, humidity, wet bulb temperature, or other attributes of the outdoor air at a plurality of future times. In some embodiments, controller 640 uses the predicted attributes of the outdoor air to evaluate state transition conditions and/or to perform closed loop control operations within various operating states. The logic used by controller 640 to evaluate state transition conditions and perform state transitions is described in greater detail below.

User devices 918 can include any of a variety of user-operable devices configured to facilitate user interaction with controller 640 and/or HVAC system. For example, user devices 918 can include a computer workstation, a desktop computer, a laptop computer, a tablet, a smartphone, a PDA, or any other type of mobile or non-mobile device. User devices 918 can include user interface elements (e.g., electronic display screens, touchscreen displays, keyboards, speakers, buttons, dials, etc.) configured to receive input from a user and provide output to a user. User devices 918 can interact with controller 640 via communications interface 912 to monitor system operation and provide input to controller 640. For example, user devices 918 can allow a user to provide controller 640 with setpoints, operating parameters, manual values for measured variables, operating commands, manual state transition commands, and/or other types of user input. Controller 640 can use the input from user devices 918 to evaluate state transition conditions and/or to perform closed loop control operations within various operating states.

HVAC equipment 930 can include any of a variety of controllable systems or devices in HVAC system 600. For example, HVAC equipment 930 can include cooling tower 602, fan 604, chiller 610, pumps 620-622, and/or valves 624-630. HVAC equipment 930 can include any of the systems or devices of HVAC system 100, waterside system 200, or airside system 300, as described with reference to FIGS. 1-3. For example, HVAC equipment 930 can include one or more chillers, boilers, AHUs, economizers, controllers, actuators, fans, pumps, electronic valves, and/or other types of equipment which can be operated by controller 640 to affect a variable state or condition (e.g., temperature, humidity, airflow, lighting, etc.) in or around building 10.

HVAC equipment 930 can include any of the systems or devices of building subsystems 428 as described with reference to FIG. 4 and/or any of the systems or devices of BMS 500 as described with reference to FIG. 5 (e.g., zone coordinators, rooftop units, VAV units, bypass dampers, etc.). HVAC equipment 930 can provide operating data to controller 640 and can receive control signals from controller 640. In some embodiments, HVAC equipment 930 operate according to the control signals to affect one or more of the variables measured by sensors 914.

Still referring to FIG. 9, controller 640 is shown to include a communications interface 912 and a processing circuit 904. Communications interface 912 can include wired or wireless interfaces (e.g., jacks, antennas, transmitters, receivers, transceivers, wire terminals, etc.) for conducting data communications with various systems, devices, or networks. For example, communications interface 912 can include an Ethernet card and port for sending and receiving data via an Ethernet-based communications network and/or a WiFi transceiver for communicating via a wireless communications network. Communications interface 912 can be configured to communicate via local area networks or wide area networks (e.g., the Internet, a building WAN, etc.) and may use a variety of communications protocols (e.g., BACnet, IP, LON, etc.).

Communications interface 912 can be a network interface configured to facilitate electronic data communications between controller 640 and various external systems or devices (e.g., sensors 914, weather service 916, user devices 918, HVAC equipment 930, etc.). For example, controller 640 can receive setpoints and operating parameters from a supervisory controller (e.g., BMS controller 366, system manager 502, etc.) via communications interface 912. Controller 640 can receive measurements from sensors 914 via communications interface 912. Controller 640 can use communications interface 912 to send control signals to HVAC equipment 930. In some embodiments, controller 640 provides user interfaces and other information to user devices 918 via communications interface 912.

Processing circuit 904 is shown to include a processor 906 and memory 908. Processor 906 can be a general purpose or specific purpose processor, an application specific integrated circuit (ASIC), one or more field programmable gate arrays (FPGAs), a group of processing components, or other suitable processing components. Processor 906 can be configured to execute computer code or instructions stored in memory 908 or received from other computer readable media (e.g., CDROM, network storage, a remote server, etc.).

Memory 908 can include one or more devices (e.g., memory units, memory devices, storage devices, etc.) for storing data and/or computer code for completing and/or facilitating the various processes described in the present disclosure. Memory 908 can include random access memory (RAM), read-only memory (ROM), hard drive storage, temporary storage, non-volatile memory, flash memory, optical memory, or any other suitable memory for storing software objects and/or computer instructions. Memory 908 can include database components, object code components, script components, or any other type of information structure for supporting the various activities and information structures described in the present disclosure. Memory 908 can be communicably connected to processor 906 via processing circuit 904 and can include computer code for executing (e.g., by processor 906) one or more processes described herein.

State Transitions and Operating States

Figure 10:
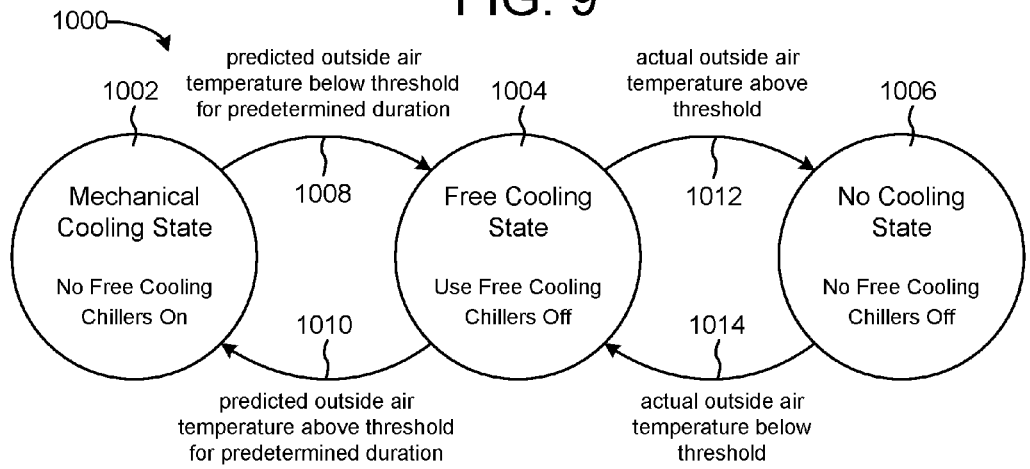
FIG. 10 is a state transition diagram illustrating the state transitions and transition conditions used by the HVAC system of FIG. 6, according to an exemplary embodiment.

Referring now to FIG. 10, a state transition diagram 1000 illustrating the operation of HVAC system 600 is shown, according to an exemplary embodiment. State transition diagram 1000 is shown to include a plurality of operating states 1002-1006 (i.e., a mechanical cooling state 1002, a free cooling state 1004, and a no cooling state 1006) and state transition conditions 1008-1014. Although only three operating states 1002-1006 are shown in state transition diagram 1000, it should be understood that state transition diagram 1000 can include any number of operating states to model systems of various complexity. In some embodiments, various sub-states can be nested within one or more of operating states 1002-1006. However, such sub-states are omitted from state transition diagram 1000 for simplicity.

State transition controller 910 can evaluate state transition conditions 1008-1014 and can transition between operating states 1002-1006 based on a result of the evaluation. State transition conditions 1008-1014 can involve time comparisons and/or value comparisons. In traditional free cooling systems, free cooling is typically used whenever the outdoor wet bulb air temperature is below a minimum temperature required for free cooling. However, the traditional approach does not take into account the economic cost associated with transitioning between operating states. For example, switching between mechanical cooling state 1002 and free cooling state 1004 may incur an economic cost. The economic cost may result from increased electricity consumption when chiller 610 is starting-up, increased equipment degradation resulting from switching chiller 610 on/off, inefficient chiller operation while chiller 610 is starting-up, electricity required to operate valves 624-630, and/or any other economic costs which are incurred as a result of the state transition.

To make free cooling economically viable, the energy and cost savings achieved by free cooling should be sufficient to overcome the cost incurred as a result of transitioning between mechanical cooling state 1002 and free cooling state 1004. Advantageously, state transition controller 910 can determine whether the use of free cooling would be economically viable by weighing the cost savings achieved by free cooling against the economic cost of performing the state transition. For example, free cooling may be economically viable only if the free cooling lasts for a minimum amount of time. State transition controller 910 can predict how long the use of free cooling would last as well as the energy savings which would be achieved by the use of free cooling during the predicted free cooling period. State transition controller 910 can weigh the predicted energy savings against the cost of performing the state transition to determine whether to transition into free cooling state 1004.

In some embodiments, state transition controller 910 is configured to predict the outside air temperature $\hat{T}_{OA}$ (e.g., predicted outside air wet bulb temperature) for each of a plurality of time steps into the future. State transition controller 910 can predict the outside air temperature $\hat{T}_{OA}$ using measurements from sensors 914 and/or weather forecasts from weather service 916. When operating in mechanical cooling state 1002, state transition controller 910 can determine whether the predicted outside air temperature $\hat{T}_{OA}$ will be below a free cooling temperature threshold $T_{FC}$ for a predetermined amount of time in the future (transition condition 1008). State transition controller 910 can transition from mechanical cooling state 1002 to free cooling state 1004 in response to a determination that state transition condition 1008 is satisfied.

In some embodiments, the free cooling temperature threshold $T_{FC}$ is a maximum outdoor air wet bulb temperature at which free cooling is possible or economically viable. The predetermined amount of time may be a minimum amount of time $t_{min,FC}$ which free cooling must last in order to justify the economic cost of transitioning into free cooling state 1004. If the predicted outside air temperature $\hat{T}_{OA}$ will not stay below the temperature threshold $T_{FC}$ for the predetermined amount of time $t_{min,FC}$, state transition controller 910 can remain in mechanical cooling state 1002, even if the current outside air temperature $T_{OA}$ is below the temperature threshold $T_{FC}$. This prevents state transition controller 910 from transitioning into free cooling state 1004 if the amount of time spent in free cooling state 1004 and the corresponding energy savings are insufficient to overcome the cost incurred as a result of the state transition.

In some embodiments, state transition controller 910 calculates the minimum free cooling time $t_{min,FC}$. State transition controller 910 can calculate the minimum free cooling time $t_{min,FC}$ by weighing the free cooling energy savings against the cost incurred as a result of switching from mechanical cooling state 1002 to free cooling state 1004. For example, state transition controller 910 can use the following equation to calculate the economic value of transitioning into free cooling state 1004 and operating in free cooling state 1004:

$$\text{Value}_{FC} = \Delta t_{FC} \text{Cost}_{elec} P_{elec} - \text{SwitchingPenalty}$$

where $\text{Value}_{FC}$ is the total economic value of transitioning into free cooling state 1004 and operating in free cooling state 1004 during the predicted free cooling period, $\Delta t_{FC}$ is the duration of the free cooling period (i.e., the predicted amount of time which will be spent in free cooling state 1004), $\text{Cost}_{elec}$ is the estimated per unit cost of electricity during the free cooling period $$\left(e.g., \frac{\$}{\text{kWh}}\right),$$

$P_{elec}$ is the estimated free cooling energy savings per unit time during the free cooling period (e.g., kW), and SwitchingPenalty is the economic or monetary cost (e.g., \$) incurred as a result of switching from mechanical cooling state 1002 to free cooling state 1004.

In the previous equation, the term $\Delta t_{FC} \text{Cost}_{elec} P_{elec}$ represents the cost savings resulting from the use of free cooling relative to mechanical cooling over the duration of the free cooling period. For example, the product of energy cost $\text{Cost}_{elec}$ $$\left(e.g., \frac{\$}{\text{kWh}}\right)$$

and energy savings per unit time $P_{elec}$ (e.g., kW) represents the economic cost of electricity which is saved by the use of free cooling during each time step of the free cooling period $$\left(e.g., \frac{\$}{\text{hour}}\right).$$

Multiplying this savings per unit time by the duration of the free cooling period $\Delta t_{FC}$ (e.g., hours) results in the total cost savings over the duration of the free cooling period. The term SwitchingPenalty represents the economic cost incurred as a result of the state transition. As previously described, the economic cost may result from increased electricity consumption during chiller start-up or shut-down, increased equipment degradation resulting from switching chiller 610 on/off, inefficient chiller operation while chiller 610 is starting-up or shutting-down, electricity required to operate valves 624-630, and/or any other economic costs which are incurred as a result of the state transition.

State transition controller 910 can calculate the minimum free cooling time $t_{min,FC}$ by finding the duration of the free cooling period $\Delta t_{FC}$ which results in a total economic value of zero (i.e., Value=0). For example, state transition controller 910 can solve the following equation to calculate the minimum free cooling time $t_{min,FC}$:

$$0 = t_{min,FC} \text{Cost}_{elec} P_{elec} - \text{SwitchingPenalty}$$

$$t_{min,FC} = \frac{\text{SwitchingPenalty}}{\text{Cost}_{elec} P_{elec}}$$

where the values of $\text{Cost}_{elec}$, $P_{elec}$, and SwitchingPenalty have known values. The value of SwitchingPenalty can be fixed, whereas the value of $\text{Cost}_{elec}$ can be received from an energy utility or predicted based upon past costs of electricity. The value of $P_{elec}$ can be predicted or estimated based on the amount of cooling required by cooling load 608.

When operating in free cooling state 1004, state transition controller 910 can determine whether the predicted outside air temperature $\hat{T}_{OA}$ will be above the temperature threshold $T_{FC}$ for a predetermined amount of time in the future (transition condition 1010). State transition controller 910 can transition from free cooling state 1004 to mechanical cooling state 1002 in response to a determination that state transition condition 1010 is satisfied. The predetermined amount of time in state transition condition 1010 can be a minimum mechanical cooling time $t_{min,MC}$ required to justify transitioning into mechanical cooling state 1002. The minimum mechanical cooling time $t_{min,MC}$ in state transition condition 1010 can be the same or different from the minimum free cooling time $t_{min,FC}$ in state transition condition 1008.

When operating in free cooling state 1004, state transition controller 910 can determine whether the actual outside air temperature $T_{OA}$ is above the temperature threshold $T_{FC}$ (transition condition 1012). State transition controller 910 can transition from free cooling state 1004 to no cooling state 1006 in response to a determination that state transition condition 1012 is satisfied. In no cooling state 1006, neither free cooling nor mechanical cooling are used. A transition into no cooling state 1006 may occur when the outside air temperature $T_{OA}$ is above the free cooling temperature threshold $T_{FC}$, but is not predicted to remain above the temperature threshold $T_{FC}$ for the minimum amount of time $t_{min,MC}$ required to justify switching back to mechanical cooling. State transition controller 910 may remain in no cooling state 1006 until the actual outside air temperature $T_{OA}$ drops below the temperature threshold $T_{FC}$.

When operating in no cooling state 1006, state transition controller 910 can determine whether the actual outside air temperature $T_{OA}$ is below the temperature threshold $T_{FC}$ (transition condition 1014). State transition controller 910 can transition from no cooling state 1006 to free cooling state 1004 in response to a determination that state transition condition 1012 is satisfied. In some embodiments, state transition controller 910 transitions from no cooling state 1006 to mechanical cooling state 1002 in response to a determination that the predicted outside air temperature $\hat{T}_{OA}$ will be above the temperature threshold $T_{FC}$ for an amount of time exceeding the minimum mechanical cooling time $t_{min,MC}$. However, such a state transition may not be necessary because state transition controller 910 may not operate in no cooling state 1006 unless the outside air temperature $T_{OA}$ is predicted to drop below the temperature threshold $T_{FC}$ within the minimum mechanical cooling time $t_{min,MC}$.

In some embodiments, state transition controller 910 determines whether to use free cooling or mechanical cooling at each of a plurality of time steps k within a horizon of duration h by optimizing a cost function J over the horizon. At each time step k, the cost function J can be written as follows:

$$J_k = C^* \vec{x}_k$$

where $J_k$ is the value of the cost function at time step k, C is a cost vector, and $\vec{x}_k$ is a vector of decision variables at time step k. The vector of decision variables $\vec{x}_k$ may include binary decision variables and/or continuous decision variables that indicate whether free cooling or mechanical cooling will be used during time step k (described in greater detail below). The cost vector C can include cost parameters that indicate an economic cost associated with each of the decision variables.

The total cost over the horizon can be expressed as follows:

$$J_{total} = \sum_{k=1}^{h} J_k = \sum_{k=1}^{h} C * \vec{x_k}$$

State transition controller 910 can determine optimal values for the decision variables in vector $\vec{x_k}$ at each time step k by optimizing (i.e., minimizing) the total cost $J_{total}$ over the horizon. Accordingly, the optimization problem can be formulated as shown in the following equation:

$$\min(J_{total}) = \min\left(\sum_{k=1}^{h} J_k\right) = \min\left(\sum_{k=1}^{h} C * \vec{x_k}\right)$$

In other embodiments, the decision vector $\vec{x_k}$ can be replaced with a decision matrix X. Each column of the decision matrix X may be the decision vector $\vec{x_k}$ for a particular time step k and may include the values of the decision variables for that time step. Each row of the decision matrix X may correspond to a particular decision variable. Each element of the decision matrix X (i.e., the intersection of a row and column) may indicate the value of the corresponding decision variable during the corresponding time step. With the decision matrix X, the total cost over the horizon can be expressed as follows:

$$J_{total} = C*X$$

and optimization problem can be formulated as shown in the following equation:

$$\min(J_{total}) = \min(C*X)$$

In some embodiments, state transition controller 910 uses a binary penalty approach to define the decision vector $\vec{x_k}$ and the cost vector C. When the binary penalty approach is used, the decision vector $\vec{x_k}$ can be defined as follows:

$$\vec{x_k} = [X_{1,k}, X_{2,k}, X_{3,k}, b_{1,k}, b_{2,k}, P_k]^T$$

where $X_{1,k}$ is the cooling load allocated to free cooling (e.g., to a free cooling subplant) at time step k, $X_{2,k}$ is the cooling load allocated to mechanical cooling (e.g., to a mechanical cooling subplant) at time step k, and $X_{3,k}$ is the remaining cooling load at time step k. The remaining cooling load $X_{3,k}$ can be designated as an unmet cooling load or allocated to another plant or subplant (e.g., thermal energy storage). The variable $b_{1,k}$ is a binary decision variable which indicates whether free cooling will be used during time step k. Similarly, the variable $b_{2,k}$ is a binary decision variable which indicates whether mechanical cooling will be used during time step k. The variable $P_k$ indicates whether the switching penalty is active during time step k.

When the binary penalty approach is used, the cost vector C can be defined as follows:

$$C = [\lambda_1 C_u, \lambda_2 C_u, \lambda_3 C_u, 0, 0, C_p]$$

where $\lambda_1$ is the efficiency of the free cooling subplant, $\lambda_2$ is the efficiency of the mechanical cooling subplant, $\lambda_3$ is the efficiency of the subplant which is allocated cooling load $X_{3,k}$, $C_u$ is the energy usage cost, and $C_p$ is the switching penalty cost.

When the binary approach is used, state transition controller 910 can optimize the total cost $J_{total}$ subject to the following constraints:

$$b_1, b_2 \in \{0,1\}$$

$$b_{1,k} + b_{2,k} = 1$$

$$X_{1,k} + X_{2,k} + X_{3,k} = Q_{Load,k}$$

$$-b_{1,k} X_{1,Max} + X_{1,k} \leq 0$$

$$-b_{2,k} X_{2,Max} + X_{2,k} \leq 0$$

$$X_{1,k} \leq X_{1,Max} FCAvail_k$$

$$b_{1,k} - b_{1,k-1} - P_k \leq 0$$

$$b_{1,k-1} - b_{1,k} - P_k \leq 0$$

where $Q_{Load,k}$ is the total cooling load to be met at time step k, $X_{1,Max}$ is the maximum capacity of the free cooling subplant, $X_{2,Max}$ is the maximum capacity of the mechanical cooling subplant, $FCAvail_k$ is a binary variable that indicates whether free cooling is available at time step k (e.g., $FCAvail_k=1$) or unavailable at time step k (e.g., $FCAvail_k=0$), and $b_{1,k-1}$ is a binary variable which indicates whether free cooling will be used at time step k−1.

In some embodiments, state transition controller 910 sets the value for $FCAvail_k$ based on the predicted outside wet bulb air temperature $T_{OA}$ at time step k. For example, state transition controller 910 can set $FCAvail_k=1$ if the predicted wet bulb air temperature $T_{OA}$ at time step k is below the free cooling temperature threshold $T_{FC}$. Similarly, state transition controller 910 can set $FCAvail_k=0$ if the predicted wet bulb air temperature $T_{OA}$ at time step k is above the free cooling temperature threshold $T_{FC}$.

In some embodiments, state transition controller 910 uses a continuous penalty approach to define the decision vector $\vec{x_k}$ and the cost vector C. When the continuous penalty approach is used, the decision vector $\vec{x_k}$ can be defined as follows:

$$\vec{x_k} = [X_{1,k}, X_{2,k}, X_{3,k}, FCAvail_k, \delta_{1,k}^+, \delta_{2,k}^+, \delta_{3,k}^+, \delta_{1,k}^-, \delta_{2,k}^-, \delta_{3,k}^-]$$

where $X_{1,k}$ is the cooling load allocated to free cooling (e.g., to a free cooling subplant) at time step k, $X_{2,k}$ is the cooling load allocated to mechanical cooling (e.g., to a mechanical cooling subplant) at time step k, and $X_{3,k}$ is the remaining cooling load at time step k. The remaining cooling load $X_{3,k}$ can be designated as an unmet cooling load or allocated to another plant or subplant (e.g., thermal energy storage). The variable $FCAvail_k$ is a binary variable that indicates whether free cooling is available at time step k (e.g., $FCAvail_k=1$) or unavailable at time step k (e.g., $FCAvail_k=$), as previously described.

The variables $\delta_{1,k}^+$, $\delta_{2,k}^+$, and $\delta_{3,k}^+$ indicate the amounts (if any) by which the cooling loads $X_{1,k}$, $X_{2,k}$, and $X_{3,k}$ increased relative to their values at the previous time step k−1. For example, the variables ($\delta_{1,k}, \delta_{2,k}$, and $\delta_{3,k}^+$) can be defined as follows:

$$\delta_{1,k}^+ = \max\begin{cases} 0 \\ X_{1,k} - X_{1,k-1} \end{cases}$$

$$\delta_{2,k}^+ = \max\begin{cases} 0 \\ X_{2,k} - X_{2,k-1} \end{cases}$$

$$\delta_{3,k}^+ = \max \begin{cases} 0 \\ X_{3,k} - X_{3,k-1} \end{cases}$$

Similarly, the variables $\delta_{1,k}^-$, $\delta_{2,k}^-$, and $\delta_{3,k}^-$ indicate the amounts (if any) by which the cooling loads $X_{1,k}$, $X_{2,k}$, and $X_{3,k}$ decreased relative to their values at the previous time step k−1. For example, the variables $\delta_{1,k}^-$, $\delta_{2,k}^-$, and $\delta_{3,k}^-$ can be defined as follows:

$$\delta_{1,k}^- = \max \begin{cases} 0 \\ X_{1,k-1} - X_{1,k} \end{cases}$$

$$\delta_{2,k}^- = \max \begin{cases} 0 \\ X_{2,k-1} - X_{2,k} \end{cases}$$

$$\delta_{3,k}^- = \max \begin{cases} 0 \\ X_{3,k-1} - X_{3,k} \end{cases}$$

When the continuous penalty approach is used, the cost vector C can be defined as follows:

$$C = [\lambda_1 C_u, \lambda_2 C_u, \lambda_3 C_u, 0, c_1^\Delta, c_2^\Delta, c_3^\Delta, c_1^\Delta, c_2^\Delta, c_3^\Delta]$$

where $\lambda_1$ is the efficiency of the free cooling subplant, $\lambda_2$ is the efficiency of the mechanical cooling subplant, $\lambda_3$ is the efficiency of the subplant which is allocated cooling load $X_{3,k}$, $c_1^\Delta$ is the penalty cost of a load change in the free cooling subplant, $c_2^\Delta$ is the penalty cost of a load change in the mechanical cooling subplant, and $c_3^\Delta$ is the penalty cost of a load change in the subplant which is allocated cooling load $X_{3,k}$.

When the continuous penalty approach is used, state transition controller 910 can optimize the total cost $J_{total}$ subject to the following constraints:

$$FCAvail_k \in \{0,1\}$$

$$X_{n,k} \geq 0$$

$$\delta_{n,k}^+ \geq 0$$

$$X_{1,k} + X_{2,k} + X_{3,k} = Q_{Load,k}$$

$$X_{n,k} \leq X_{n,Max}$$

$$X_{1,k} \leq M_{big} FCAvail_k$$

$$X_{2,k} \leq M_{big}(1 - FCAvail_k)$$

$$(T_{OA,k} - T_{FC}) - M_{big}(1 - FCAvail_k) \leq 0$$

where $X_{n,k}$ is the cooling load allocated to subplant n at time step k (n=1 . . . 3), $\delta_{n,k}^+$ is the increase (if any) in the cooling load allocated to subplant n between time step k−1 and time step k, $\delta_{n,k}^-$ is the decrease (if any) in the cooling load allocated to subplant n between time step k−1 and time step k, $X_{n,Max}$ is the maximum capacity of subplant n, $Q_{Load,k}$ is the total cooling load to be met at time step k, $T_{OA,k}$ is the predicted outside air wet bulb temperature at time step k, $T_{FC}$ is the free cooling temperature threshold (e.g., the maximum outside air wet bulb temperature at which free cooling is thermodynamically viable), and $M_{big}$ is a sufficiently large number (e.g., $M_{big} = 10^{10}$).

In both the binary penalty approach and the continuous penalty approach, state transition controller 910 can use mixed integer linear programming to optimize the total cost $J_{total}$ over the duration of the horizon. For example, consider a twelve hour horizon with a time step each hour (i.e., k=1 . . . 12). As a result of the optimization, state transition controller 910 can generate the following vectors $X_1$, $X_2$, and $X_3$ which include the optimal values of $X_{1,k}$, $X_{2,k}$, and $X_{3,k}$ at each of the twelve time steps:

$$X_1 = [0,0,0,Q_4,Q_5,Q_6,Q_8,0,Q_{10},Q_{11},0]$$

$$X_2 = [Q_1,Q_2,0,0,0,0,0,0,0,0,0,Q_{12}]$$

$$X_3 = [0,0,0,0,0,0,0,0,Q_9,0,0,0]$$

In this example, the cooling load was allocated to free cooling during time steps 4-8 and 10-11, as indicated by the non-zero values $Q_4$, $Q_5$, $Q_6$, $Q_7$, $Q_8$, $Q_{10}$, and $Q_{11}$ in vector $X_1$. This indicates that free cooling is economically optimal during hours 4-8 and 10-11 of the horizon. The cooling load was allocated to mechanical cooling during time steps 1-3 and 12, as indicated by the non-zero values of $Q_1$, $Q_2$, $Q_3$, and $Q_{12}$ in vector $X_2$. This indicates that mechanical cooling is economically optimal during hours 1-3 and 12 of the horizon. The cooling load was allocated to neither free cooling nor mechanical cooling during time step 9, as indicated by the value of $Q_9$ in vector $X_3$. This indicates that neither free cooling nor mechanical cooling is economically optimal during hour 9 of the horizon, and the cooling load is shifted to thermal energy storage or another subplant represented by $X_3$.

Each of state controllers 920 can operate as a closed loop controller within the corresponding operating state 1002-1006. For example, mechanical cooling state controller 922 can control system operation in mechanical cooling state 1002, free cooling state controller 924 can control system operation in free cooling state 1004, and no cooling state controller 926 can control system operation in no cooling state 1006. In some embodiments, each of state controllers 920 becomes active in response to a determination that state transition controller 910 has transitioned into the corresponding operating state and inactive in response to a determination that state transition controller 910 has transitioned out of the corresponding operating state. For example, mechanical cooling state controller 922 can become active in response to a determination that state transition controller 910 has transitioned into mechanical cooling state 1002 and inactive in response to a determination that state transition controller 910 has transitioned out of mechanical cooling state 1002. Similarly, free cooling state controller 924 can become active in response to a determination that state transition controller 910 has transitioned into free cooling state 1004 and inactive in response to a determination that state transition controller 910 has transitioned out of free cooling state 1004.

In some embodiments, each of state controllers 920 uses a different control algorithm, different control logic, and/or a different control methodology (e.g., PID control, extremum seeking control, model predictive control, etc.). This allows controller 640 to function as multiple different controllers, each of which controls the operation of HVAC system 600 in a designated operating state. For example, mechanical cooling state controller 922 can control system operation in mechanical cooling state 1002 by activating chiller 610 and using chiller 610 to provide cooling for cooling load 608, as described with reference to FIG. 7. Free cooling state controller 924 can control system operation in free cooling state 1004 by deactivating chiller 610 and using cooling tower 602 to directly cool the chilled fluid in chilled fluid circuit 636, as described with reference to FIG. 8.

Flow Diagram

Figure 11:
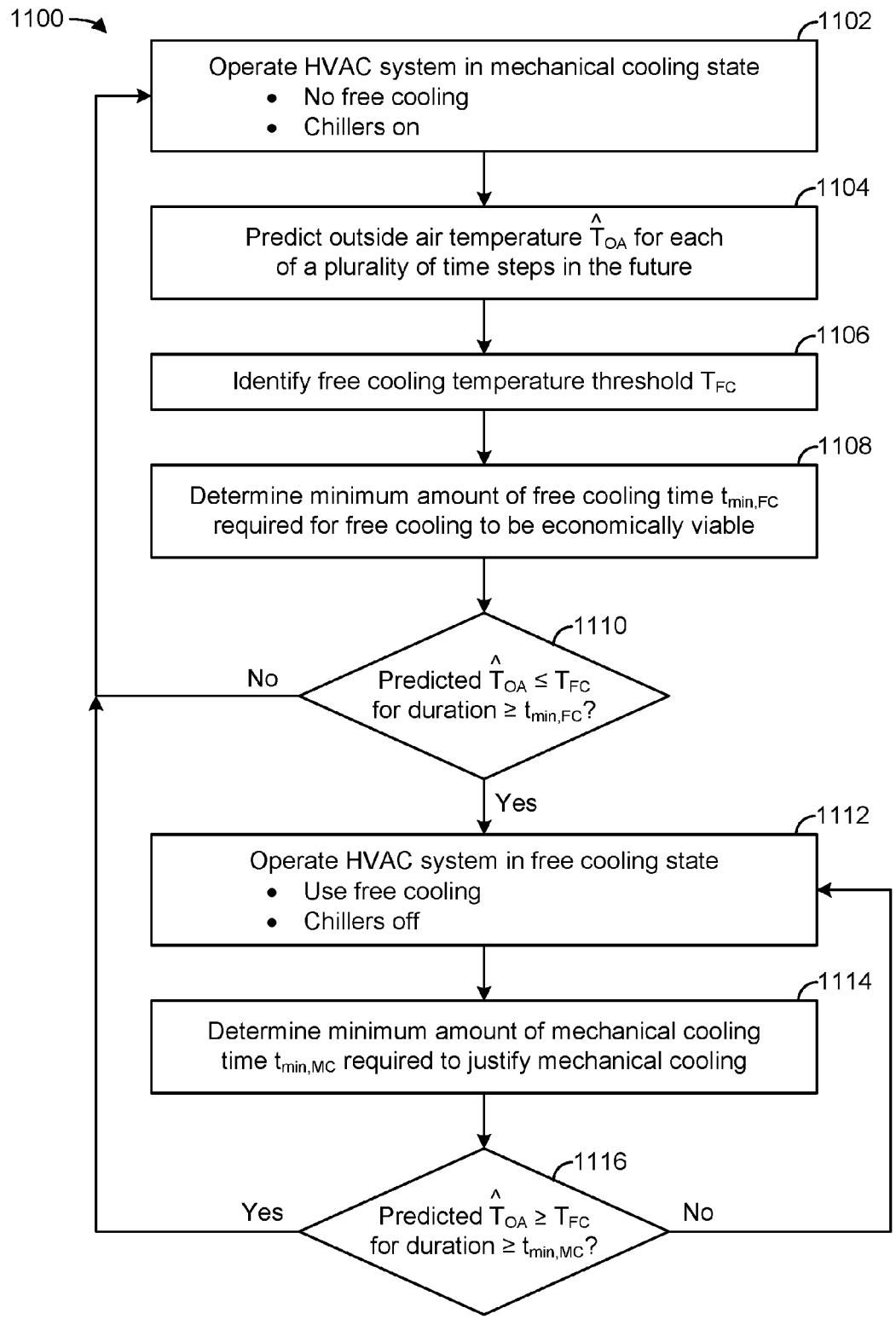
FIG. 11 is a flowchart of a process for operating the HVAC system of FIG. 6 in the mechanical cooling state and the free cooling state is shown, according to an exemplary embodiment.

Referring now to FIG. 11, a flow diagram of a process 1100 for operating a HVAC system in a mechanical cooling state and a free cooling state is shown, according to an exemplary embodiment. Process 1100 can be performed by one or more components of HVAC system 600, as described with reference to FIGS. 6-10. In some embodiments, process 1100 is performed by controller 640.

Process 1100 is shown to include operating the HVAC system in a mechanical cooling state (step 1102). In the mechanical cooling state (illustrated in FIG. 7), one or more chillers (e.g., chiller 610) can used to provide cooling for the chilled fluid in chilled fluid circuit 636. Both chilled fluid circuit 636 and cooling tower circuit 632 can be fluidly connected to chiller 610. Heat exchanger 606 may not be used and the fluid conduits connecting to heat exchanger 606 may be blocked. Free cooling may not be used in the mechanical cooling state.

In the mechanical cooling state, controller 640 may operate valve 624 to direct the cool water from cooling tower 602 through condenser 612. Condenser 612 transfers heat from the refrigerant in refrigeration circuit 634 to the cool water in cooling tower circuit 632, thereby warming the water. The warm water then flows from condenser 612 to valve 626. Controller 640 operates valve 626 to direct the warm water to cooling tower 602. Cooling tower 602 transfers heat from the water to cooler air flowing through cooling tower 602. Controller 640 can operate fan 604 to modulate the airflow through cooling tower 602, which adjusts the rate of heat transfer in cooling tower 602. Controller 640 can also operate pump 620 to modulate the flow rate of the water through cooling tower circuit 632, which adjusts the rate of heat transfer in cooling tower 602 and/or condenser 612.

In the mechanical cooling state, controller 640 may operate valve 630 to direct the fluid exiting cooling load 608 through evaporator 616. Evaporator 616 transfers heat from the fluid in chilled fluid circuit 636 to the refrigerant in refrigeration circuit 634, thereby chilling the fluid in chilled fluid circuit 636. The chilled fluid then flows from evaporator 616 to valve 628. Controller 640 operates valve 628 to direct the chilled fluid to cooling load 608. Cooling load 608 rejects heat to the chilled fluid, thereby providing cooling for cooling load 608 and warming the chilled fluid. Controller 640 can operate pump 622 to modulate the flowrate of the chilled fluid through chilled fluid circuit 636, which adjusts the rate of heat transfer in evaporator 616 and/or at cooling load 608.

Still referring to FIG. 11, process 1100 is shown to include predicting outside air temperature $\hat{T}_{OA}$ for each of a plurality of time steps in the future (step 1104). In some embodiments, the predicted outside air temperature $\hat{T}_{OA}$ is a wet bulb temperature of the air outside the building cooled by HVAC system 600. The outside air temperature $\hat{T}_{OA}$ can be predicted using measurements from sensors 914 and/or weather forecasts from weather service 916.

Process 1100 is shown to include identifying a free cooling temperature threshold $T_{FC}$ (step 1106). In some embodiments, the free cooling temperature threshold $T_{FC}$ is a maximum outside air wet bulb temperature at which free cooling is possible or economically viable. The free cooling temperature threshold $T_{FC}$ can be based on the temperature setpoint for the building or zone cooled by HVAC system 600. For example, the free cooling temperature threshold $T_{FC}$ may be approximately 40° F. for a building with a temperature setpoint around 70° F.

Process 1100 is shown to include determining a minimum amount of free cooling time $t_{min,FC}$ required for free cooling to be economically viable (step 1108). To make free cooling economically viable, the energy and cost savings achieved by free cooling should be sufficient to overcome the cost incurred as a result of transitioning between mechanical cooling state 1002 and free cooling state 1004. Step 1108 can include determining the minimum amount of time for which HVAC system 600 must continue to operate in free cooling state 1004 in order to offset the cost incurred as a result of the state transition.

In some embodiments, step 1108 includes calculating the minimum free cooling time $t_{min,FC}$. The minimum free cooling time $t_{min,FC}$ can be calculated by weighing the free cooling energy savings against the cost incurred as a result of switching from mechanical cooling state 1002 to free cooling state 1004. For example, step 1108 can include using the following equation to calculate the economic value of transitioning into free cooling state 1004 and operating in free cooling state 1004:

$$\text{Value}_{FC} = \Delta t_{FC} \text{Cost}_{elec} P_{elec} - \text{SwitchingPenalty}$$

where $\text{Value}_{FC}$ is the total economic value of transitioning into free cooling state 1004 and operating in free cooling state 1004 during the predicted free cooling period, $\Delta t_{FC}$ is the duration of the free cooling period (i.e., the predicted amount of time which will be spent in free cooling state 1004), $\text{Cost}_{elec}$ is the estimated per unit cost of electricity during the free cooling period $$\left(e.g., \frac{\$}{\text{kWh}}\right),$$

$P_{elec}$ is the estimated free cooling energy savings per unit time during the free cooling period (e.g., kW), and SwitchingPenalty is the economic or monetary cost (e.g., $) incurred as a result of switching from mechanical cooling state 1002 to free cooling state 1004.

In the previous equation, the term $\Delta t_{FC} \text{Cost}_{elec} P_{elec}$ represents the cost savings resulting from the use of free cooling relative to mechanical cooling over the duration of the free cooling period. For example, the product of energy cost $\text{Cost}_{elec}$ $$\left(e.g., \frac{\$}{\text{kWh}}\right)$$

and energy savings per unit time $P_{elec}$ (e.g., kW) represents the economic cost of electricity which is saved by the use of free cooling during each time step of the free cooling period $$\left(e.g., \frac{\$}{\text{hour}}\right).$$

Multiplying this savings per unit time by the duration of the free cooling period $\Delta t_{FC}$ (e.g., hours) results in the total cost savings over the duration of the free cooling period. The term SwitchingPenalty represents the economic cost incurred as a result of the state transition. As previously described, the economic cost may result from increased electricity consumption during chiller start-up or shut-down, increased equipment degradation resulting from switching chiller 610 on/off, inefficient chiller operation while chiller 610 is starting-up or shutting-down, electricity required to operate valves 624-630, and/or any other economic costs which are incurred as a result of the state transition.

Step 1108 can include calculating the minimum free cooling time $t_{min,FC}$ by finding the duration of the free cooling period $\Delta t_{FC}$ which results in a total economic value of zero (i.e., Value=0). For example, the minimum free cooling time $t_{min,FC}$ can be calculated using the following equation:

$$0 = t_{min,FC} \text{Cost}_{elec} P_{elec} - \text{SwitchingPenalty}$$

$$t_{min,FC} = \frac{\text{SwitchingPenalty}}{\text{Cost}_{elec} P_{elec}}$$

where the values of $\text{Cost}_{elec}$, $P_{elec}$, and SwitchingPenalty have known values. The value of SwitchingPenalty can be fixed, whereas the value of $\text{Cost}_{elec}$ can be received from an energy utility or predicted based upon past costs of electricity. The value of $P_{elec}$ can be predicted or estimated based on the amount of cooling required by cooling load 608.

Still referring to FIG. 11, process 1100 is shown to include determining whether the predicted outside air temperature $\hat{T}_{OA}$ will be less than or equal to the free cooling temperature threshold $T_{FC}$ for a duration greater than or equal to the minimum free cooling time $t_{min,FC}$ (step 1110). If the predicted outside air temperature $T_{OA}$ will not remain below the temperature threshold $T_{FC}$ for at least the minimum free cooling time $t_{min,FC}$ (i.e., the result of step 1110 is "no"), process 1100 may return to step 1102 and continue to operate HVAC system 600 in the mechanical cooling state 1002. However, if the predicted outside air temperature $\hat{T}_{OA}$ will remain below the temperature threshold $T_{FC}$ for at least the minimum free cooling time $t_{min,FC}$ (i.e., the result of step 1110 is "yes"), process 1100 may proceed to step 1112.

Process 1100 is shown to include operating the HVAC system in a free cooling state (step 1112). In the free cooling state, heat exchanger 606 can be used to provide cooling for the chilled fluid in chilled fluid circuit 636. Both chilled fluid circuit 636 and cooling tower circuit 632 can be fluidly connected to heat exchanger 606. Chiller 610 may not be used in the free cooling state and the fluid conduits connecting to chiller 610 can be blocked.

In the free cooling state, controller 640 can operate valve 624 to direct the cool water from cooling tower 602 through heat exchanger 606. Heat exchanger 606 transfers heat from the fluid in chilled fluid circuit to the cool water in cooling tower circuit 632, thereby warming the water. The warm water then flows from heat exchanger 606 to valve 626. Controller 640 operates valve 626 to direct the warm water to cooling tower 602. Cooling tower 602 transfers heat from the water to cooler air flowing through cooling tower 602. Controller 640 can operate fan 604 to increase or decrease the airflow through cooling tower 602, which increases or decreases the rate of heat transfer in cooling tower 602. Controller 640 can also operate pump 620 to modulate the flow rate of the water through cooling tower circuit 632, which adjusts the rate of heat transfer in cooling tower 602 and/or heat exchanger 606.

In the free cooling state, controller 640 can operate valve 630 to direct the fluid exiting cooling load 608 through heat exchanger 606. Heat exchanger 606 transfers heat from the fluid in chilled fluid circuit 636 to the water in cooling tower circuit 632, thereby chilling the fluid in chilled fluid circuit 636. The chilled fluid then flows from heat exchanger 606 to valve 628. Controller 640 operates valve 628 to direct the chilled fluid to cooling load 608. Cooling load 608 rejects heat to the chilled fluid, thereby providing cooling for cooling load 608 and warming the chilled fluid. Controller 640 can operate pump 622 to modulate the flowrate of the chilled fluid through chilled fluid circuit 636, which adjusts the rate of heat transfer in heat exchanger 606 and/or at cooling load 608.

Still referring to FIG. 11, process 1100 is shown to include determining a minimum amount of mechanical cooling time $t_{min,MC}$ required to justify mechanical cooling (step 1114) and determining whether the predicted outside air temperature $\hat{T}_{OA}$ will be greater than or equal to the free cooling temperature threshold $T_{FC}$ for a duration greater than or equal to the minimum mechanical cooling time $t_{min,MC}$ (step 1116). If the predicted outside air temperature $\hat{T}_{OA}$ will not remain above the temperature threshold $T_{FC}$ for at least the minimum mechanical cooling time $t_{min,MC}$ (i.e., the result of step 1116 is "no"), process 1100 may return to step 1112 and continue to operate HVAC system 600 in the free cooling state 1004. However, if the predicted outside air temperature $\hat{T}_{OA}$ will remain above the temperature threshold $T_{FC}$ for at least the minimum mechanical cooling time $t_{min,MC}$ (i.e., the result of step 1116 is "yes"), process 1100 may return to step 1102 and transition HVAC system into the mechanical cooling state 1002.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system for a building, the HVAC system comprising:
   a chiller configured to provide mechanical cooling for a cooling load in the building when the HVAC system operates in a mechanical cooling state;
   a heat exchanger separate from the chiller and configured to provide free cooling for the cooling load in the building when the HVAC system operates in a free cooling state; and
   a controller configured to:
   predict outside air temperature for a plurality of future time steps;
   calculate a minimum free cooling time based on an estimated cost savings resulting from operating the HVAC system in the free cooling state relative to operating the HVAC system in the mechanical cooling state, wherein the minimum free cooling time is a minimum amount of time the HVAC system must operate in the free cooling state for the estimated cost savings to offset a cost of transitioning into the free cooling state:
   determine whether the predicted outside air temperature will be less than a free cooling temperature threshold for at least the minimum free cooling time; and
   transition the HVAC system from operating in the mechanical cooling state to operating in the free cooling state in response to a determination that the predicted outside air temperature will be less than the free cooling temperature threshold for at least the minimum free cooling time.

2. The HVAC system of claim 1, wherein the controller is configured to:
   determine whether the predicted outside air temperature will be greater than the free cooling temperature threshold for at least a minimum mechanical cooling time; and
   transition the HVAC system from operating in the free cooling state to operating in the mechanical cooling state in response to a determination that the predicted outside air temperature will be greater than the free cooling temperature threshold for at least the minimum mechanical cooling time.

3. The HVAC system of claim 1, wherein the controller is configured to:
   identify an actual outside air temperature;
   determine whether the actual outside air temperature is above the free cooling temperature threshold; and
   transition the HVAC system from operating in the free cooling state to operating in a no cooling state in response to a determination that the actual outside air temperature is above the free cooling temperature threshold.

4. The HVAC system of claim 3, wherein the controller is configured to transition the HVAC system from operating in the free cooling state to operating in the no cooling state in response to a determination that the actual outside air temperature is currently above the free cooling temperature threshold and predicted to drop below the free cooling temperature threshold within a predetermined amount of time.

5. The HVAC system of claim 1, wherein the controller is configured to:
   identify an actual outside air temperature;
   determine whether the actual outside air temperature is below the free cooling temperature threshold; and
   transition the HVAC system from operating in a no cooling state to operating in the free cooling state in response to a determination that the actual outside air temperature is below the free cooling temperature threshold.

6. The HVAC system of claim 5, wherein the controller is configured to transition the HVAC system from operating in the no cooling state to operating in the mechanical cooling state in response to a determination that the actual outside air temperature is currently above the free cooling temperature threshold and predicted to remain above the free cooling temperature threshold for at least a predetermined amount of time.

7. The HVAC system of claim 1, wherein the controller is configured to calculate the minimum free cooling time by:
   identifying the cost incurred as a result of transitioning the HVAC system into the free cooling state;
   estimating the cost savings resulting from operating the HVAC system in the free cooling state relative to operating the HVAC system in the mechanical cooling state as a function of an amount of time the HVAC system operates in the free cooling state; and
   determining the minimum amount of time the HVAC system is required to operate in the free cooling state for the cost savings to be greater than or equal to the cost incurred.

8. The HVAC system of claim 7, wherein the controller is configured to estimate the cost savings by:
   determining an amount of energy savings resulting from operating the HVAC system in the free cooling state relative to operating the HVAC system in the mechanical cooling state;
   identifying a cost per unit energy for each of the future time steps during which the HVAC system will operate in the free cooling state; and
   calculating the cost savings by multiplying the amount of energy savings by the cost per unit energy.

9. The HVAC system of claim 7, wherein the cost incurred comprises at least one of an economic cost of equipment degradation and an increase in electricity cost resulting from stopping and restarting starting the chiller.

10. A method for operating a heating, ventilation, or air conditioning (HVAC) system for a building, the method comprising:
   operating the HVAC system in a mechanical cooling state in which a chiller is used to provide mechanical cooling for a cooling load in the building;
   predicting outside air temperature for a plurality of future time steps;
   calculating a minimum free cooling time based on an estimated cost savings resulting from operating the HVAC system in a free cooling state relative to operating the HVAC system in the mechanical cooling state, wherein the minimum free cooling time is a minimum amount of time the HVAC system must operate in the free cooling state for the estimated cost savings to offset a cost of transitioning into the free cooling state;

determining whether the predicted outside air temperature will be less than a free cooling temperature threshold for at least the minimum free cooling time;

transitioning the HVAC system from operating in the mechanical cooling state to operating in the free cooling state in response to a determination that the predicted outside air temperature will be less than the free cooling temperature threshold for at least the minimum free cooling time; and operating the HVAC system in the free cooling state in which a heat exchanger separate from the chiller is used to provide free cooling for the cooling load in the building.

11. The method of claim 10, further comprising:
determining whether the predicted outside air temperature will be greater than the free cooling temperature threshold for at least a minimum mechanical cooling time; and transitioning the HVAC system from operating in the free cooling state to operating in the mechanical cooling state in response to a determination that the predicted outside air temperature will be greater than the free cooling temperature threshold for at least the minimum mechanical cooling time.

12. The method of claim 10, further comprising:
identifying an actual outside air temperature;
determining whether the actual outside air temperature is above the free cooling temperature threshold; and
transitioning the HVAC system from operating in the free cooling state to operating in a no cooling state in response to a determination that the actual outside air temperature is above the free cooling temperature threshold.

13. The method of claim 12, wherein transitioning the HVAC system from operating in the free cooling state to operating in the no cooling state occurs in response to a determination that the actual outside air temperature is currently above the free cooling temperature threshold and predicted to drop below the free cooling temperature threshold within a predetermined amount of time.

14. The method of claim 10, further comprising:
identifying an actual outside air temperature;
determining whether the actual outside air temperature is below the free cooling temperature threshold; and
transitioning the HVAC system from operating in a no cooling state to operating in the free cooling state in response to a determination that the actual outside air temperature is below the free cooling temperature threshold.

15. The method of claim 14, wherein transitioning the HVAC system from operating in the no cooling state to operating in the mechanical cooling state occurs in response to a determination that the actual outside air temperature is currently above the free cooling temperature threshold and predicted to remain above the free cooling temperature threshold for at least a predetermined amount of time.

16. The method of claim 10, further comprising calculating the minimum free cooling time by:
identifying the cost incurred as a result of transitioning the HVAC system into the free cooling state;
estimating the cost savings resulting from operating the HVAC system in the free cooling state relative to operating the HVAC system in the mechanical cooling state as a function of an amount of time the HVAC system operates in the free cooling state; and
determining the minimum amount of time the HVAC system is required to operate in the free cooling state for the cost savings to be greater than or equal to the cost incurred.

17. The method of claim 16, wherein estimating the cost savings comprises:
determining an amount of energy savings resulting from operating the HVAC system in the free cooling state relative to operating the HVAC system in the mechanical cooling state;
identifying a cost per unit energy for each of the future time steps during which the HVAC system will operate in the free cooling state; and
calculating the cost savings by multiplying the amount of energy savings by the cost per unit energy.

18. The method of claim 16, wherein the cost incurred comprises at least one of an economic cost of equipment degradation and an increase in electricity cost resulting from stopping and restarting starting the chiller.

* * * * *